US009886177B2

(12) United States Patent
Lee et al.

(10) Patent No.: US 9,886,177 B2
(45) Date of Patent: Feb. 6, 2018

(54) METHOD FOR INCREASING GUI RESPONSE SPEED OF USER DEVICE THROUGH DATA PRELOADING, AND SAID USER DEVICE

(71) Applicant: INDUSTRY-ACADEMIC COOPERATION FOUNDATION, YONSEI UNIVERSITY, Seoul (KR)

(72) Inventors: Seung Yup Lee, Seoul (KR); Ju Wan Yoo, Incheon (KR); Gun Hee Han, Incheon (KR)

(73) Assignee: INDUSTRY-ACADEMIC COOPERATION FOUNDATION, YONSEI UNIVERSITY (KR)

( * ) Notice: Subject to any disclaimer, the term of this patent is extended or adjusted under 35 U.S.C. 154(b) by 327 days.

(21) Appl. No.: 14/434,970

(22) PCT Filed: Oct. 10, 2013

(86) PCT No.: PCT/KR2013/009039
§ 371 (c)(1),
(2) Date: Apr. 10, 2015

(87) PCT Pub. No.: WO2014/058233
PCT Pub. Date: Apr. 17, 2014

(65) Prior Publication Data
US 2015/0277710 A1    Oct. 1, 2015

(30) Foreign Application Priority Data

Oct. 11, 2012  (KR) .................. 10-2012-0113119
May 3, 2013    (KR) .................. 10-2013-0050090

(51) Int. Cl.
*G06F 3/00*        (2006.01)
*G06F 3/0484*     (2013.01)
(Continued)

(52) U.S. Cl.
CPC .......... *G06F 3/04842* (2013.01); *G06F 3/013* (2013.01); *G06F 3/0482* (2013.01);
(Continued)

(58) Field of Classification Search
CPC .. G06F 3/04842; G06F 3/013; G06F 3/04812; G06F 3/0482; G06F 3/0488
See application file for complete search history.

(56) References Cited

U.S. PATENT DOCUMENTS 6,362,842 B1 * 3/2002 Tahara ................ G06F 3/04812
                                                           715/705
6,604,103 B1 * 8/2003 Wolfe ............... G06F 17/30306
(Continued)

FOREIGN PATENT DOCUMENTS

JP    10293689      11/1998
KR    100574045     4/2006
(Continued)

OTHER PUBLICATIONS

International Search Report dated Oct. 10, 2013 issued in corresponding Korean Application No. PCT/KR2013/009039.

*Primary Examiner* — Omar Abdul-Ali
(74) *Attorney, Agent, or Firm* — Onello & Mello, LLP

(57) ABSTRACT

Provided is a data preloading method which improves the response speed of a user device by predicting whether a particular object provided on a graphic user interface (GUI) will be selected based on the position of a pointer before the particular object is selected by a user and preloading data that should be loaded when the particular object is selected.

13 Claims, 28 Drawing Sheets

(51) Int. Cl.
  *G06F 3/0488* (2013.01)
  *G06F 3/0481* (2013.01)
  *G06F 3/0482* (2013.01)
  *G06F 3/01* (2006.01)

(52) U.S. Cl.
  CPC .......... *G06F 3/0484* (2013.01); *G06F 3/0488* (2013.01); *G06F 3/04812* (2013.01)

(56) References Cited

U.S. PATENT DOCUMENTS

| | | | | |
|---|---|---|---|---|
| 7,747,749 | B1* | 6/2010 | Erikson | G06F 17/30902 709/219 |
| 2005/0223329 | A1* | 10/2005 | Schwartz | G06F 3/04817 715/711 |
| 2013/0086517 | A1* | 4/2013 | Van Lancker | G06F 3/04815 715/800 |
| 2014/0094315 | A1* | 4/2014 | Stine | A63F 13/12 463/42 |
| 2015/0193395 | A1* | 7/2015 | Nicolaou | G06F 17/30902 707/726 |
| 2016/0256784 | A1* | 9/2016 | Schultz | A63F 13/79 |

FOREIGN PATENT DOCUMENTS

| | | |
|---|---|---|
| KR | 2010081406 | 7/2010 |
| KR | 2012035771 | 4/2012 |

* cited by examiner

METHOD FOR INCREASING GUI RESPONSE SPEED OF USER DEVICE THROUGH DATA PRELOADING, AND SAID USER DEVICE

TECHNICAL FIELD

The present invention relates to a method of increasing graphic user interface (GUI) response speed of a user device through data preloading and a user device using the method, and more particularly, to a method of providing an immediate response to a user's selection of a particular GUI object by preloading data and a user device using the method.

BACKGROUND ART

A mobile user interface with an operating system that uses a graphic user interface (GUI) as a human-computer interfacing means is being widely popularized. In addition, various attempts have been made to increase the GUI response speed of the mobile user interface.

Korean Patent Publication No. 2010-0045868 discloses a technology that performs a particular function in response to a mouse-over event. In addition, U.S. Pat. No. 8,112,619 discloses a technology that preloads an application to increase the execution speed of the application. However, these literatures fail to disclose a method of providing an immediate response to a user's selection of a particular GUI object and a user device using the method.

DISCLOSURE

Technical Problem

Aspects of the present invention provide a data preloading method which improves the response speed of a user device by predicting whether a particular object provided on a graphic user interface (GUI) will be selected based on the position of a pointer before the particular object is selected by a user and preloading data that should be loaded when the particular object is selected.

Aspects of the present invention also provide a data preloading method which improves the response speed of a user device by predicting whether a particular object provided on a GUI will be selected based on a gap between a pointing device and a touch display before the particular object is selected by a user and preloading data that should be loaded when the particular object is selected.

Aspects of the present invention also provide a data preloading method which improves the response speed of a user device by receiving a selection pre-notification signal, adding a selection target object corresponding to the selection pre-notification signal to a preload pool, and preloading data of the selection target object added to the reload pool before the selection target object provided on a GUI is selected by a user.

Aspects of the present invention also provide a user device which improves response speed by receiving a selection pre-notification touch input to a touch display and preloading data of an object corresponding to the selection pre-notification touch input.

Aspects of the present invention also provide a user device which improves response speed by predicting whether a particular object provided on a GUI will be selected based on the position of a pointer and a user's gaze before the particular object is selected by the user and preloading data that should be loaded when the particular object is selected.

Aspects of the present invention also provide a data preloading method which improves the response speed of a user device by predicting whether a particular object provided on a GUI will be selected based on the position of a pointer and a user's gaze before the particular object is selected by the user and preloading data that should be loaded when the particular object is selected.

Aspects of the present invention also provide a data preloading method which determines whether to perform data preloading by creating a mathematical model, which indicates a selection pattern, using collected parameter data of an input pattern and determining, in real time, data about a user's pointer manipulation to be one of a selection pattern and a non-selection pattern.

However, aspects of the present invention are not restricted to the one set forth herein. The above and other aspects of the present invention will become more apparent to one of ordinary skill in the art to which the present invention pertains by referencing the detailed description of the present invention given below.

Technical Solution

According to an aspect of the present invention, there is provided a data preloading method of a user device. The data preloading method includes: predicting whether a selection target object included in a graphic user interface (GUI) will be selected by analyzing a user input to the user device; preloading load target data, which should be loaded when the selection target object is selected, if it is predicted that the selection target object will be selected; and accessing the preloaded data if the selection target object is selected.

According to an embodiment, the predicting of whether the selection target object included in the GUI will be selected may be performed by analyzing the user input, for example, by analyzing a position of a pointer according to the manipulation of a pointing device or by analyzing a gap between the pointing device and a touch display panel. It should be noted that a method used by the present invention to perform the predicting of whether the selection target object included in the GUI will be selected is not limited to a particular user input analysis method. According to an embodiment, the predicting of whether the selection target object included in the GUI will be selected may include predicting that the selection target object will be selected if the pointer stays in a preload region of the selection target object for more than a predetermined period of time. According to another embodiment, the predicting of whether the selection target object included in the GUI will be selected may include, if a moving speed of the pointer satisfies a predetermined requirement, predicting that a selection target object selected based on the position of the pointer at a time when the moving speed of the pointer satisfies the predetermined requirement will be selected. According to an embodiment, the predicting of whether the selection target object included in the GUI will be selected may include predicting whether the selection target object will be selected by inputting data about the user input to the user device into a mathematical model indicating a selection prediction pattern.

The data preloading method may further include: determining a preloading region of the selection target object in proportion to the proportion of the selection target object in a total area of the GUI; and adjusting the area of the determined preloading region according to a size of the load target data.

The preloading of the load target data may include preloading a part of the load target data, wherein a size of the part to be preloaded is determined according to a type of the load target data.

The preloading of the part of the load target data may include preloading at least another part of the load target data by sensing a reduction in a distance between the pointing device and a touch display of the user device.

The preloading of the part of the load target data may include preloading at least another part of the load target data by sensing a reduction in a distance between a touch means and a display of the user device by analyzing an image captured by a camera placed on a front side of the user device.

According to another aspect of the present invention, there is provided a data preloading method including: preloading load target data, which should be loaded when a selection target object is selected, if at least part of a region in which the selection target object is disposed is included in a preload region formed based on a position of a pointer for more than a predetermined period of time; and accessing the preloaded data if the selection target object is selected.

According to an embodiment, the preload region may have a weight which increases as it is closer to the position of the pointer. Here, the preloading of the load target data may include, if there are a plurality of objects whose disposition regions are at least partially included in the preload region, selecting one selection target object based on a weight corresponding to an overlapping region between the preload region and each of the disposition regions in which the objects are disposed.

According to another aspect of the present invention, there is provided a data preloading method of a user device. The data preloading method includes: measuring and analyzing a gap between a point tip of a pointing device and a touch display of the user device; predicting whether a selection target object corresponding to a position pointed at by the pointing device among objects displayed on the touch display will be selected using the result of analysis; preloading load target data, which should be loaded when the selection target object is selected, if it is predicted that the selection target object will be selected; and accessing the preloaded data if the selection target data is selected.

The predicting of whether the selection target object corresponding to the position pointed at by the pointing device among the objects displayed on the touch display will be selected may include predicting that the selection target object will be selected if the gap between the pointing device and the touch display is less than a predetermined limit. Here, the preloading of the load target data may include preloading a part of the load target data if the gap is less than a predetermined first limit and preloading at least another part of the load target data if the gap is less than a predetermined second limit which is smaller than the first limit.

The predicting of whether the selection target object corresponding to the position pointed at by the pointing device among the objects displayed on the touch display will be selected may include predicting that the selection target object will be selected if the speed of reduction in the gap between the pointing device and the touch display is more than a predetermined limit. That is, the predicting of whether the selection target object corresponding to the position pointed at by the pointing device among the objects displayed on the touch display will be selected may include predicting that the selection target object will be selected if the speed of the pointing device moving toward the touch display is greater than a predetermined limit.

According to another aspect of the present invention, there is provided a data preloading method including: receiving a selection pre-notification signal according to manipulation of a pointing device and adding a selection target object corresponding to the selection pre-notification signal to a preload pool; preloading load target data that should be loaded when the selection target object is selected for each selection target object added to the preload pool; and accessing the preloaded data if one of the selection target objects included in the preload pool is selected.

The preloading of the load target data may include inserting the load target data into a preload cache included in a user device, and the accessing of the preloaded data may include deleting the preloaded data from the preload cache after the accessing of the preloaded data.

The preloading of the load target data may include inserting the load target data into a preload cache included in a user device and automatically deleting the load target data inserted into the preload cache after a predetermined period of time.

According to another aspect of the present invention, there is provided a user device including: a touch display which displays a selection target object; a preload cache; a selection prediction unit which receives a selection pre-notification touch input for the selection target object displayed on the touch display and inserts load target data, which should be loaded when the selection target object is selected, into the preload cache; and a data access unit which accesses the load target data stored in the preload cache if the selection target object is selected by a touch on the selection target object displayed on the touch display and displays the result of processing the load target data on the touch display.

The selection pre-notification touch input may be when a pointer stays in a preload region of the selection target object for more than a predetermined period of time. In particular, the selection pre-notification touch input may be when the pointer stays in the preload region of the selection target object in a non-contact state for more than the predetermined period of time.

According to another aspect of the present invention, there is provided a user device including: a display which displays a selection target object; a preload cache; a selection prediction unit which receives a pointing related input signal, determines whether to preload the selection target object in view of both a region in which the selection target object is disposed and a pointer position determined based on the pointing related input signal, and inserts load target data, which should be loaded when the selection target object is selected, into the preload cache if determining to preload the selection target object; and a data access unit which accesses the load target data stored in the preload cache if the selection target object is selected and displays the result of processing the load target data on the display.

According to another aspect of the present invention, there is provided a user device including: a pupil recognition unit which calculates gaze coordinates indicating a user's pupil position; a preloading unit which preloads target object data, which should be loaded when the selection target object is selected, if a pointer stays in a preload region of the selection target object for more than a predetermined period of time and if a gaze position determined by the gaze coordinates and the preload region are included in the same gaze region; and a data access unit which accesses the preloaded target object data if the selection target object is selected by the user's manipulation.

According to an embodiment, if the gaze position and the preload region are included in different gaze regions, the preloading unit may preload the target object data according to a moving direction and a moving distance of the gaze position based on a gaze region in which the preload region is included. The moving direction may be a direction toward the gaze region in which the preload region is included.

According to an embodiment, the direction toward the gaze region in which the preload region is included may be determined based on whether an angle determined by a current gaze position and a new gaze position after a movement from the current gaze position is included in a preset angle range, and the preloading unit may load the target object data and store the target object data in a preload cache unit.

According to an embodiment, the preloading unit may preload the target object data, which should be loaded when the selection target object is selected, if a distance between the gaze position determined by the gaze coordinates and a position of the pointer decreases to less than a preset limit distance.

According to an embodiment, the preloading unit may delete the target object data stored in the preload cache unit if an input for selecting the selection target object is not made for a predetermined period of time. The user device may further include: a gaze recording unit which records a movement history of the gaze coordinates; a gaze movement pattern determination unit which determines a gaze movement pattern using data recorded by the gaze recording unit; and a region personalization unit which places gaze regions according to the determined gaze movement pattern.

According to another aspect of the present invention, there is provided a data preloading method including: calculating gaze coordinates indicating a user's pupil position; preloading target object data, which should be loaded when a selection target object is selected, if a pointer stays in a preload region of the selection target object for more than a predetermined period of time and if a gaze position determined by the gaze coordinates and the preload region are included in the same gaze region; and accessing the preloaded target object data if the selection target object is selected by the user's manipulation.

According to an embodiment, the preloading of the target object data may include, if the gaze position and the preload region are included in different gaze regions, preloading the target object data according to a moving direction and a moving distance of the gaze position based on a gaze region in which the preload region is included. The moving direction may be a direction toward the gaze region in which the preload region is included.

According to an embodiment, the direction toward the gaze region in which the preload region is included may be determined based on whether an angle determined by a current gaze position and a new gaze position after a movement from the current gaze position is included in a preset angle range.

According to another aspect of the present invention, there is provided a data preloading method including: calculating gaze coordinates indicating a user's pupil position; preloading target object data, which should be loaded when a selection target object is selected, if a pointer stays in a preload region of the selection target object for more than a predetermined period of time and if a gaze position determined by the gaze coordinates and the preload region are included in the same gaze region; and accessing the preloaded target object data if the selection target object is selected by the user's manipulation.

According to the present invention, the various requirements introduced above to determine whether to perform preloading can be used in combination.

Advantageous Effects

According to the present invention, an immediate user interface (UI) response to a user's manipulation can be provided. For example, in a case where a user selects a particular video link using a stylus pen, a video can be preloaded, that is, buffered while the stylus pen is approaching the video link, and the buffered video data can be immediately reproduced at a time when the video link is selected using the stylus pen. Therefore, a user of a user device employing a data preloading method according to the present invention can experience immediate response speed without improving hardware performance.

However, the effects of the present invention are not restricted to the one set forth herein. The above and other effects of the present invention will become more apparent to one of daily skill in the art to which the present invention pertains by referencing the claims.

DESCRIPTION OF DRAWINGS

The above and other aspects and features of the present invention will become more apparent by describing in detail exemplary embodiments thereof with reference to the attached drawings, in which.

MODE FOR INVENTION

Figure 1:
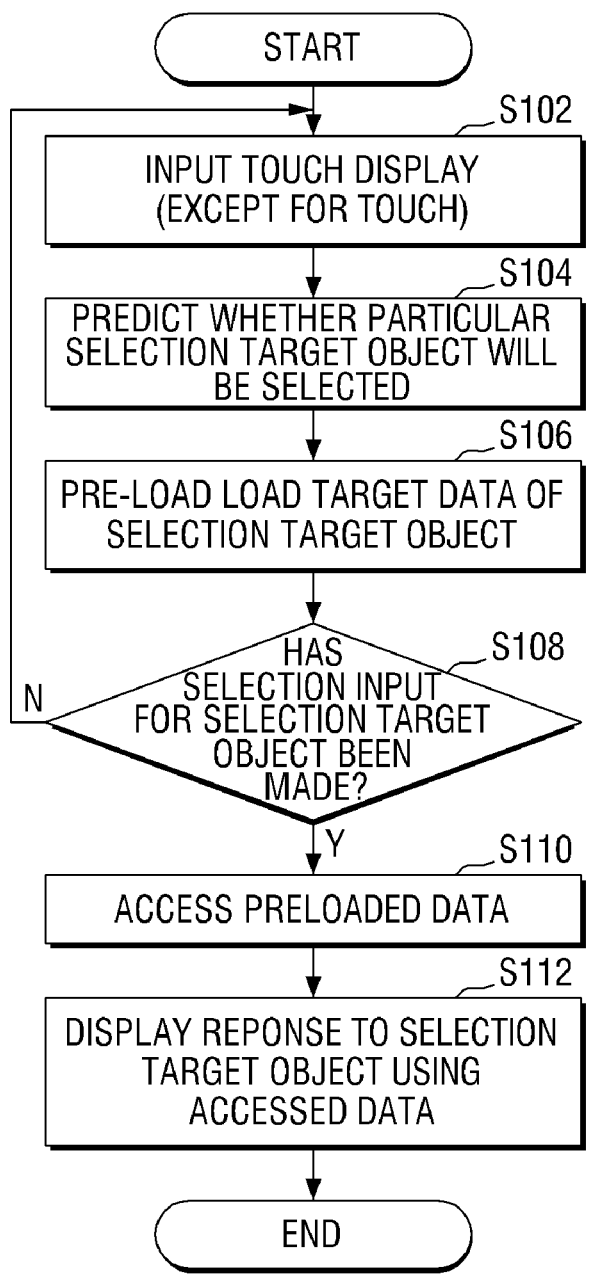
FIG. 1 is a flowchart illustrating a data preloading method according to an embodiment of the present invention.

The present invention will now be described more fully with reference to the accompanying drawings, in which exemplary embodiments of the invention are shown. Advantages and features of the present invention and methods of accomplishing the same may be understood more readily by reference to the following detailed description of exemplary embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated components, but do not preclude the presence or addition of one or more other components.

Hereinafter, embodiments of the present invention will be described with reference to block diagrams or flowchart illustrations. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

The term 'unit' or 'module', as used herein, means, but is not limited to, a software or hardware component, such as a Field Programmable Gate Array (FPGA) or Application Specific Integrated Circuit (ASIC), which performs certain tasks. A unit or module may advantageously be configured to reside on the addressable storage medium and configured to execute on one or more processors. Thus, a unit or module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units or modules may be combined into fewer components and units or modules or further separated into additional components and units or modules.

According to an embodiment of the present invention, there is provided a data preloading method.

A data preloading method according to the present invention is applicable to all user devices that support both an input for selecting a particular object included in a graphic user interface (GUI) and a pointer movement input for moving between a plurality of objects included in the GUI.

A data preloading method according to an embodiment of the present invention will now be described with reference to FIG. 1.

For example, a user device may include a touch display. Hereinafter, a user device including a touch display will be referred to as a 'touch-type user device.'

For example, the user device may not include a touch display. Instead, the user device may support an input device that includes both a selection means and a pointer moving means such as a mouse, a trackball, a stylus, a touchpad, etc. Hereinafter, a user device that supports both an input for selecting a particular object and a pointer movement input using an input device having both a selection means and a pointer moving means will be referred to as a 'mouse-type user device.'

As mentioned above, a touch-type user device should be limited to support both a touch input for selecting a particular object and a touch input for moving a pointer. The touch-type user device may support a non-contact touch. The non-contact touch may be when a touch sensor included in a touch display senses a pointing device or finger not in contact with the touch display. For example, the non-contact touch may be interpreted as the touch input for moving a pointer, and a contact touch may be interpreted as the touch input for selecting a particular object.

To support the non-contact touch, the touch-type user device may include, but not limited to, an electromagnetic induction-type touch display, an active capacitance-type touch display, or an infrared sensor for sensing the position of a finger in a non-contact touch state.

The current embodiment begins with a user device receiving an input for moving a pointer (operation S102). For example, the user device may receive a mouse movement signal or a non-contact touch signal.

Next, the user device predicts whether a particular selection target object will be selected by analyzing the received signal (operation S104).

According to an embodiment, the user device may predict whether the particular selection target object will be selected based on the position of a pointer. For example, if the pointer stays in a region in which the particular selection target object is disposed or in a predetermined preload region allocated to the object or if a preload region formed around the pointer includes at least part of the region in which the object is disposed, it can be predicted that the object will be selected.

According to an embodiment, the user device may also predict whether the particular selection target object will be selected based on the moving speed of the pointer. For example, the position of the pointer at a time when the moving speed of the pointer decreases from a predetermined first limit speed or above to a predetermined second limit speed or below may be designated as a preload snapshot position, and an object disposed at the preload snapshot position or an object having a preload region including the preload snapshot position may be selected as the selection target object. Then, it may be predicted that the selection target object will be selected by a user. The first limit speed may be greater than the second limit speed. However, the first limit speed may also be equal to the second limit speed. According to an embodiment, the user device may also predict whether the particular selection target object will be selected by reflecting both the position of the pointer and the moving speed of the pointer. For example, even if the pointer stays in the region in which the object is disposed or in the predetermined preload region allocated to the object, if the moving speed of the pointer exceeds a predetermined limit or if the pointer stays for less than a predetermined period of time, it cannot be predicted that the object will be selected.

According to an embodiment, the user device may also predict whether the particular selection target object will be selected based on a gap between a display and a pointing device in a non-contact touch state or based on whether a predefined selection pre-notification signal has been input. Various embodiments of predicting whether the particular selection target object will be selected will be described later. However, it should be noted that a method of predicting whether the particular selection target object will be selected is not limited to a particular user input analysis method.

According to an embodiment, the user device may also predict whether the particular selection target object will be selected by establishing a selection prediction mathematical model based on collected user input parameter data and inputting a user input signal, which is received in real time, to the mathematical model.

Next, when predicting that the particular selection target object will be selected, the user device preloads load target data that should be loaded when the selection target object is selected (operation S106). The load target data may be loaded to a preload cache included in the user device. The preload cache may be configured using, e.g., a random access memory (RAM) included in the user device.

The load target data may be data stored in the user device. That is, the load target data may be data stored in a storage unit (e.g., a hard disk, a solid-state drive (SSD), or a memory card) other than a memory included in the user device. In addition, the load target data may be data received from an external device via a network.

If the prediction of the user device is correct, the selection target object will actually be selected (operation S108). In this case, an application that provides the selection target object immediately accesses the preloaded data (operation S110) and displays a response to the selection of the selection target object using the accessed data (operation S112). This can reduce the data loading time.

The prediction can be incorrect. For example, the user may position the pointer on a particular object to select the object but may not actually click on the object. However, even if the prediction is correct only 50% of the time, the data loading speed perceived by the user may increase approximately twice.

A data preloading method according to an embodiment of the present invention will now be described with reference to FIG. 2. The current embodiment determines whether to perform preloading based on whether a pointer stays in a preload region of a selection target object for more than a predetermined period of time. In the current embodiment, even if the pointer stays in the preload region of the selection target object for more than the predetermined period of time, if the moving speed of the pointer exceeds a predetermined limit, preloading may not be performed.

Figure 2:
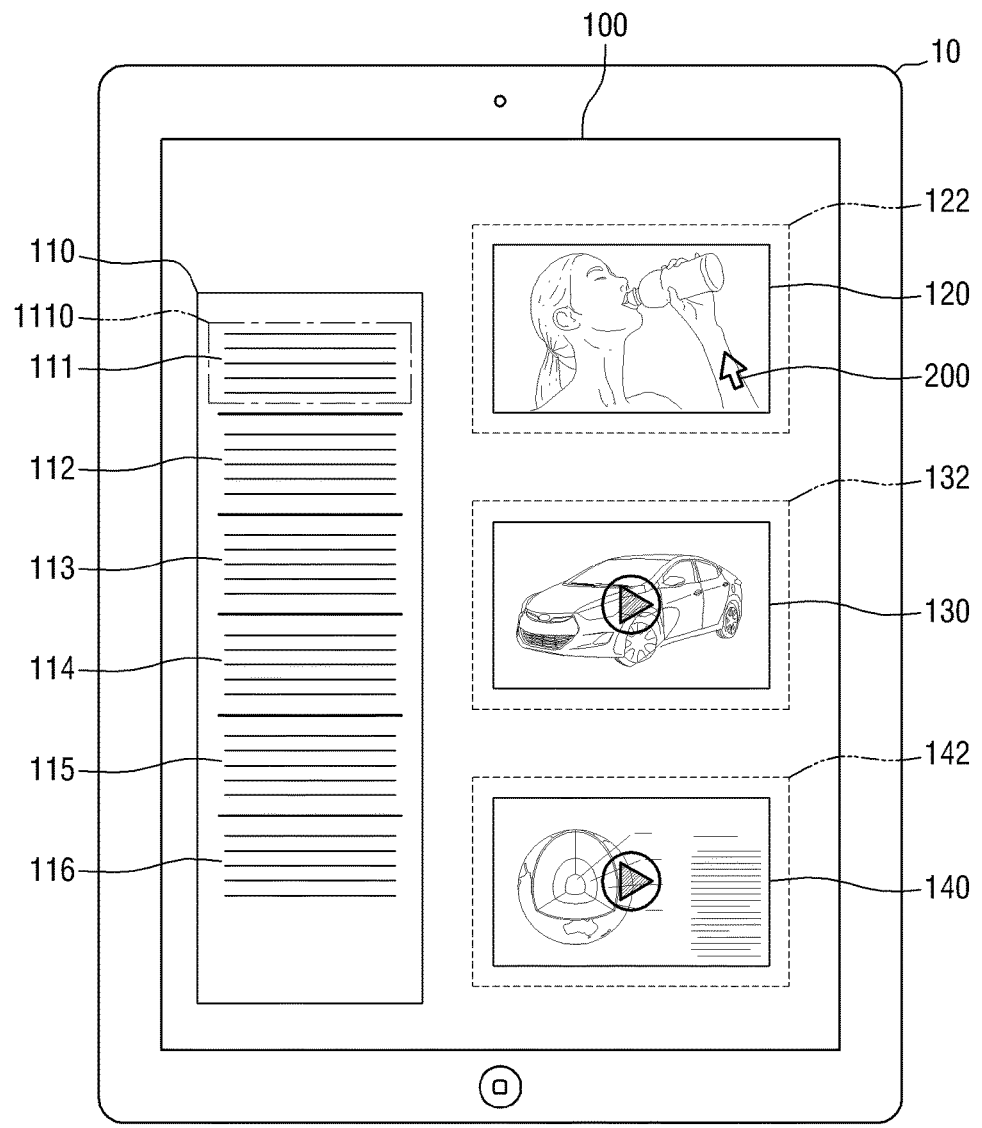
FIGS. 2 through 4 are conceptual diagrams illustrating a method of predicting whether an object will be selected based on a preload region of the object in the data preloading method according to an embodiment of the present invention.

Referring to FIG. 2, various forms of objects may constitute a GUI provided by a user device 10. For example, the user device 10 may provide a GUI which includes a plurality of objects 111 through 116 included in a list 110, an object 120 for enlarging an image, and objects 130 and 140 for reproducing videos.

According to the current embodiment, each of the objects 111 through 116, 120, 130 and 140 has a preload region. According to the current embodiment, if a pointer stays in a preload region of a particular object for more than a predetermined period of time, preloading is initiated by predicting that the particular object will be selected. The preload region of the particular object is a region in which the particular object is displayed. If a selection input, such as a mouse click or a touch, is made within this region, the preload region may be the same as a disposition region in which the selection input for the particular object is processed. The preload region can be enlarged or reduced within a predetermined range from the disposition region.

To select a particular object, a user generally moves the pointer to a region in which the particular object is displayed and selects the particular object after a predetermined waiting time. Using this pattern, the current embodiment can predict whether the user will select a particular object.

According to an embodiment, a pointer staying time (a requirement for initiating preloading) in a preload region of a particular object may be automatically increased or decreased from an initial set value by statistically analyzing the pointer staying time before a user selects a particular object.

According to an embodiment, even if the pointer stays in a preload region of a selection target object for more than the pointer staying time, if the moving speed of the pointer exceeds a predetermined limit, preloading may not be performed. This is because if a region in which the selection target object is disposed is wide, the pointer staying time can be exceeded even while the pointer is moving across the region. In this case, it is not necessary to perform preloading.

In FIG. 2, a preload region 1110 of one 111 of the objects 111 through 116 included in the list 110 is illustrated. Also, a preload region 122 of the image object 120 and preload regions 132 and 142 of the video objects 130 and 140 are illustrated. In FIG. 2, the pointer is staying in the preload region 122 of the image object 120 for more than a predetermined period of time. In this case, according to the current embodiment, image data corresponding to the image object 120 may be preloaded.

The list 110 may be, for example, an e-mail list. Only the subject and sender of a mail may be displayed in each item (111 through 116) of the list 110. A user may select an item in order to read the content of the mail. According to the conventional art, when a mail item is selected, mail content begins to be loaded from a storage unit included in a user device or a mail server connected via a network. In the current embodiment, however, if the pointer stays in a mail item for more than a predetermined period of time, mail content is preloaded at that time. Then, when a user selects the mail item, the preloaded mail content is accessed immediately. Therefore, the mail content can be read immediately.

According to an embodiment, the user device can adjust the area of a preload region of a selection target object based on a region in which the selection target object is displayed according to an hourly required amount of load target data. The hourly required amount of the load target data may be, for example, a bit rate of video content.

Figure 3:
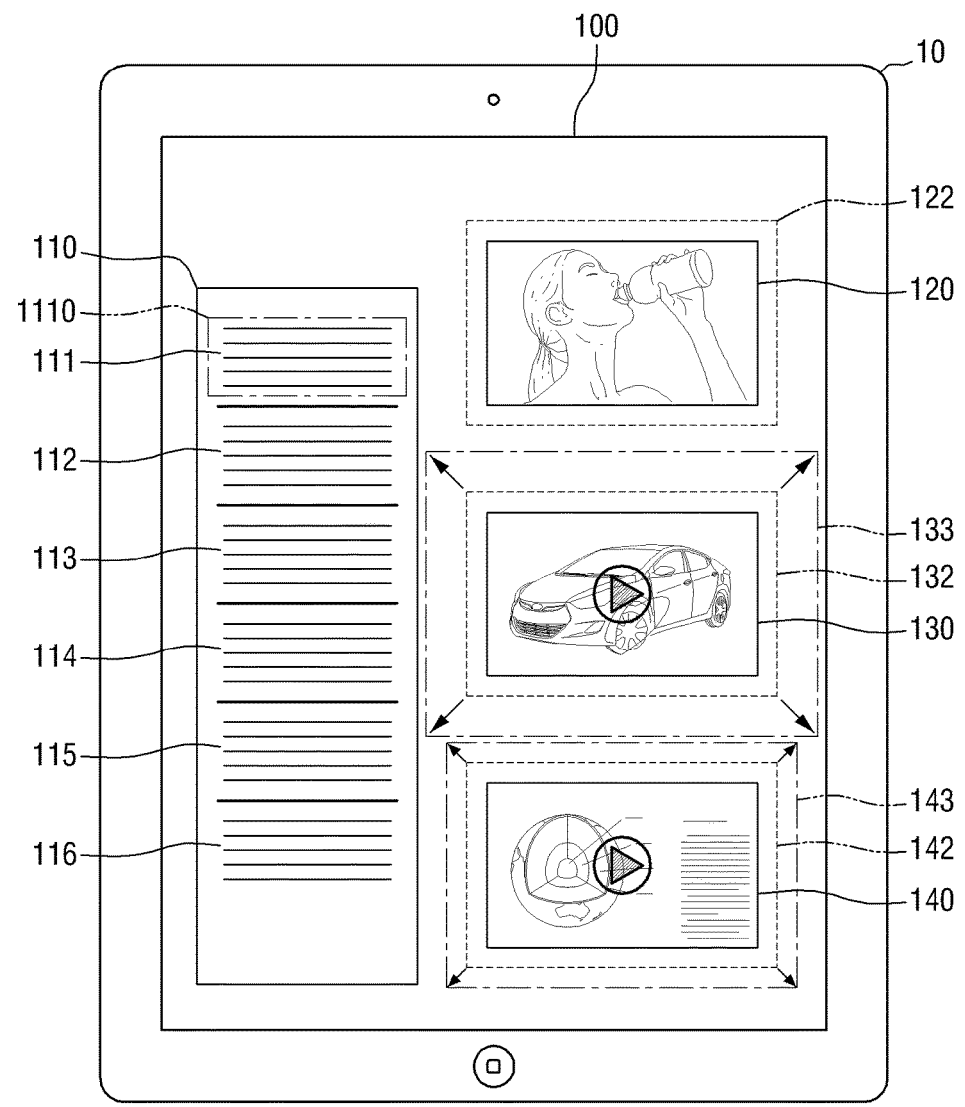

FIG. 3 illustrates an embodiment in which a preload region of a selection target object becomes wider as an hourly amount of load target data increases.

A preload region of a first video object 130 is determined to be a first region 132 in proportion to the proportion of the first video object 130 in the total area of a GUI and is expanded to a second region 132 in proportion to an hourly required amount of video data. Likewise, a preload region of a second video object 140 is determined to be a first region 142 in proportion to the proportion of the second video object 140 in the total area of the GUI and is expanded to a second region 143 in proportion to an hourly required amount of video data. In FIG. 3, the preload region of the second video object 140 is expanded less than the preload region of the first video object 130 based on the assumption that a bit rate of load target data of the second video object 140 is smaller than that of load target data of the first video object 130.

The larger the hourly required amount of load target data, the greater the reduction in the preloading time. Therefore, a user device may increase the area of a preload region as the size of load target data increases, thereby increasing the probability of preloading for an object having large-sized load target data.

Figure 4:
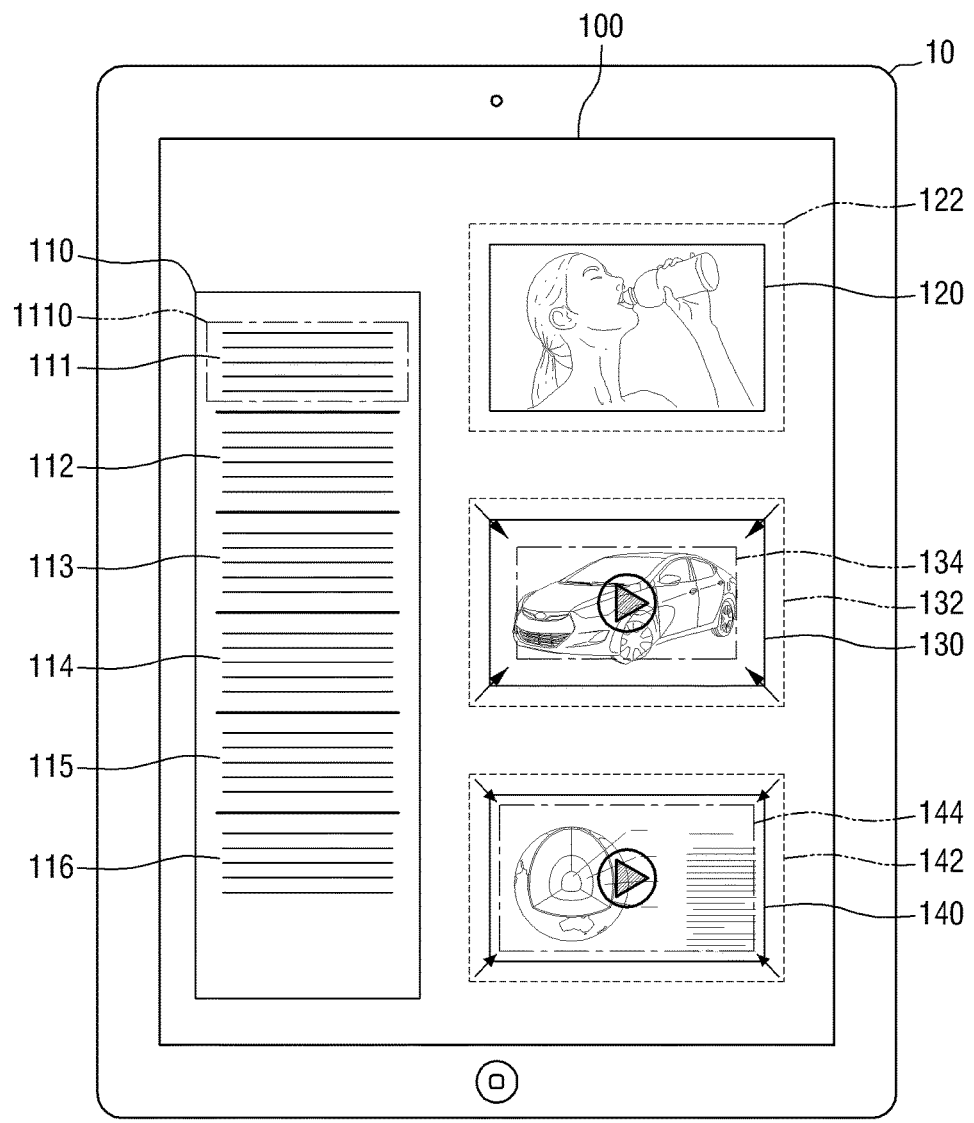

Contrary to FIG. 3, FIG. 4 illustrates an embodiment in which a preload region of a selection target object becomes narrower as an hourly required amount of load target data increases.

A preload region of a first video object 130 is determined to be a first region 132 according to the proportion of the first video object 130 in the total area of a GUI and is reduced to a second region 134 by a size proportional to a bit rate of load target data of the first video object 130. Likewise, a preload region of a second video object 140 is determined to be a second region 142 according to the proportion of the second video object 140 in the total area of the GUI and is reduced to a second region 144 by a size proportional to a bit rate of load target data of the second video object 140. In FIG. 4, the preload region of the second video object 140 is reduced less than the preload region of the first video object 130 based on the assumption that the bit rate of the load target data of the second video object 140 is smaller than that of the load target data of the first video object 130.

Since data preloading is an operation that also consumes system resources, more load may be put on a user device 10 as an hourly required amount of load target data increases. Therefore, the probability of preloading can be reduced by reducing the area of a preload region as the hourly required amount of the load target data increases.

In the embodiments of FIGS. 3 and 4, the area of a preload region of a selection target object is adjusted based on an hourly required amount of data to be preloaded. A weight used here may be increased or decreased according to the accuracy rate of a preloaded object selection prediction. That is, in the case of a high accuracy rate, the user device applies a weight that increases the area of each preload region, so that data preloading can be performed frequently. In the case of a low accuracy rate, the user device applies a weight that reduces the area of each preload region, thereby reducing the number of times that data preloading is performed.

According to an embodiment, if a preload region formed around a pointer includes at least part of a region in which a particular object is disposed, it can be predicted that the object will be selected. This embodiment will now be described with reference to FIGS. 5 through 7.

Figure 5:
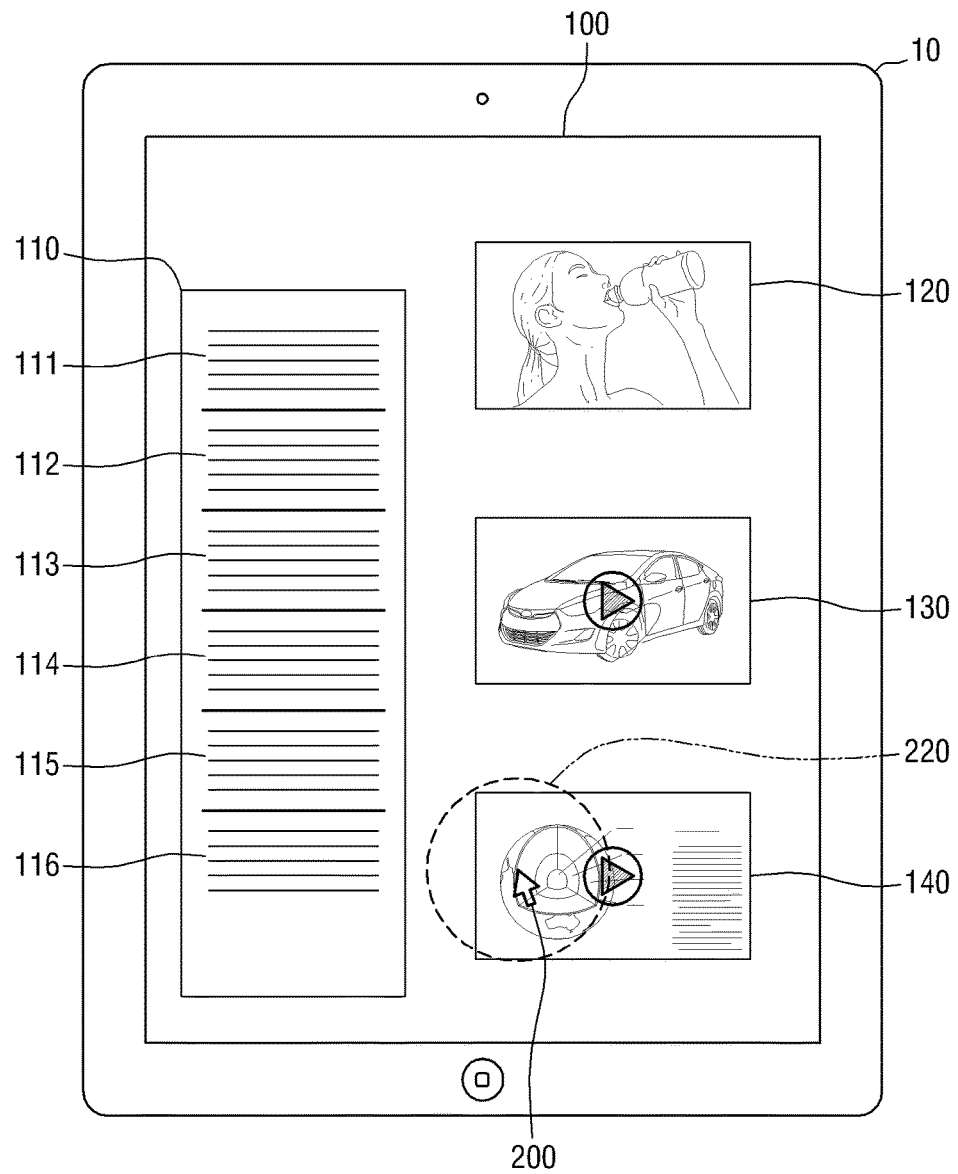
FIGS. 5 through 7 are conceptual diagrams illustrating a method of predicting whether an object will be selected based on the position of a pointer in the data preloading method according to an embodiment of the present invention.

FIG. 5 illustrates a preload region 220 formed around a pointer 200. In a GUI, the preload region 220 may be displayed transparent or semi-transparent or may not be displayed at all. In FIG. 5, the preload region 220 is shaped like a circle with the pointer 200 at its center. However, the shape of the preload region 220 is not limited to the circular shape. The preload region 220 is moved in accordance with the movement of the pointer 220.

As described above, if the preload region 220 formed around the pointer 200 includes at least part of a region in which a particular object is disposed, it can be predicted that the object will be selected.

In FIG. 5, the preload region 220 overlaps part of a region in which a second video object 140. Therefore, if a state in which the preload region 220 overlaps part of the region in which the second video object 140 is disposed lasts for more than a predetermined period of time, preloading may be initiated by predicting that the second video object 140 will be selected. According to an embodiment, even if the state in which the preload region 220 overlaps part of the region in which the second video object 140 is disposed lasts for more than the predetermined period of time, if the moving speed of the pointer 200 exceeds a predetermined limit, preloading may not be initiated because the preload region 220 is merely passing the region in which the second video object 140 is disposed.

There may be a plurality of objects whose disposition regions are partially overlapped by the preload region 220. Here, one object whose disposition region is overlapped the most by the preload region 220 may be selected as a preload target, all objects may be selected as preload targets, or a predetermined number of objects may be selected as preload targets in order of the largest overlapping region to the smallest.

Figure 6:
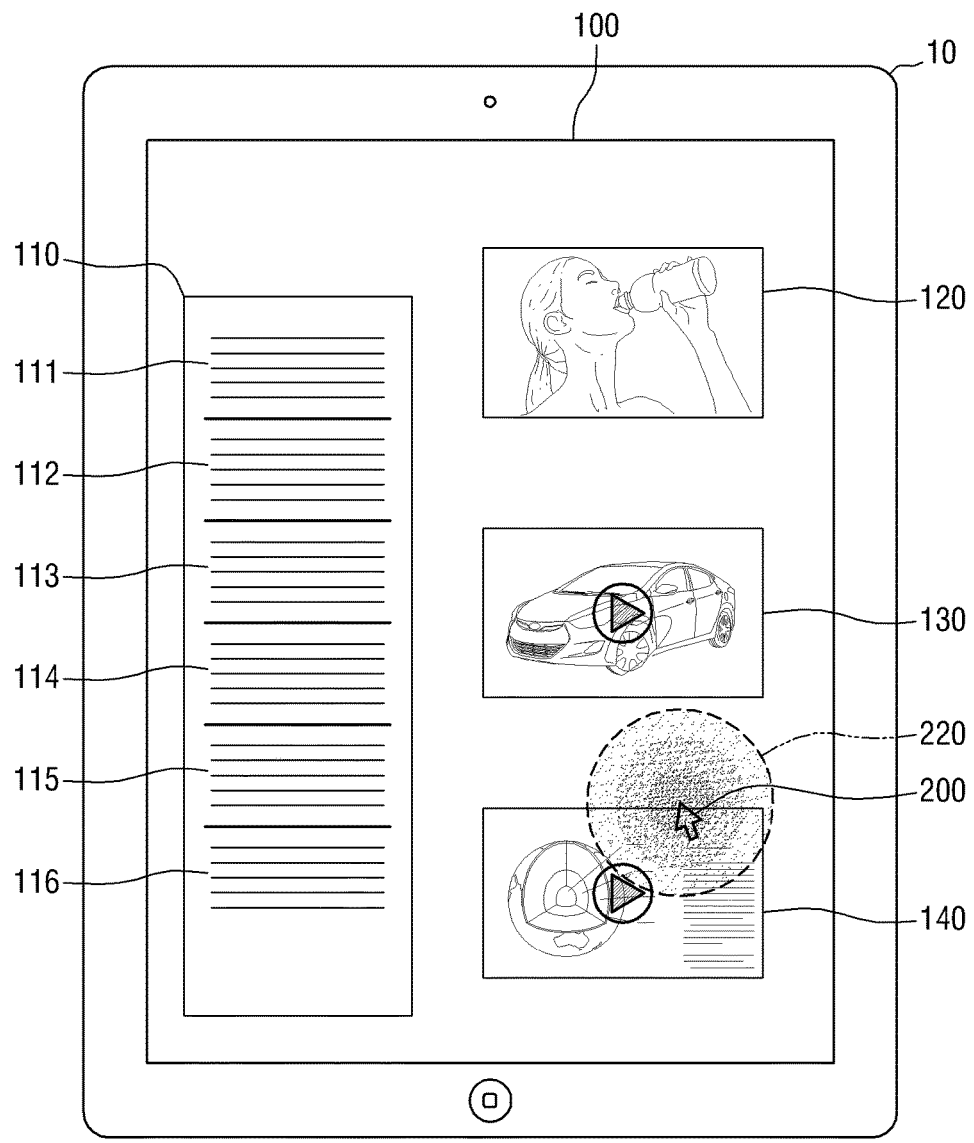

Referring to FIG. 6, a variable weight may be formed in the preload region 220. If there are a plurality of objects whose disposition regions are partially overlapped by the preload region 220, the weight may be used to select a preload target.

The weight may have a higher value, as it is closer to the pointer 200, as illustrated in FIG. 6. An overlapping region between the preload region 220 and a region in which an object is disposed is given a weight corresponding to the overlapping region of the preload region 220. In the case of FIG. 6, both a region in which a first video object 130 is disposed and a region in which the second video object 140 is disposed overlap the preload region 220. Since a weight for an overlapping region between the disposition region of the first video object 130 and the preload region 220 is lower than a weight for an overlapping region between the disposition region of the second video object 140 and the preload region 220, the second video object 140 may be selected as a preload target.

Figure 7:
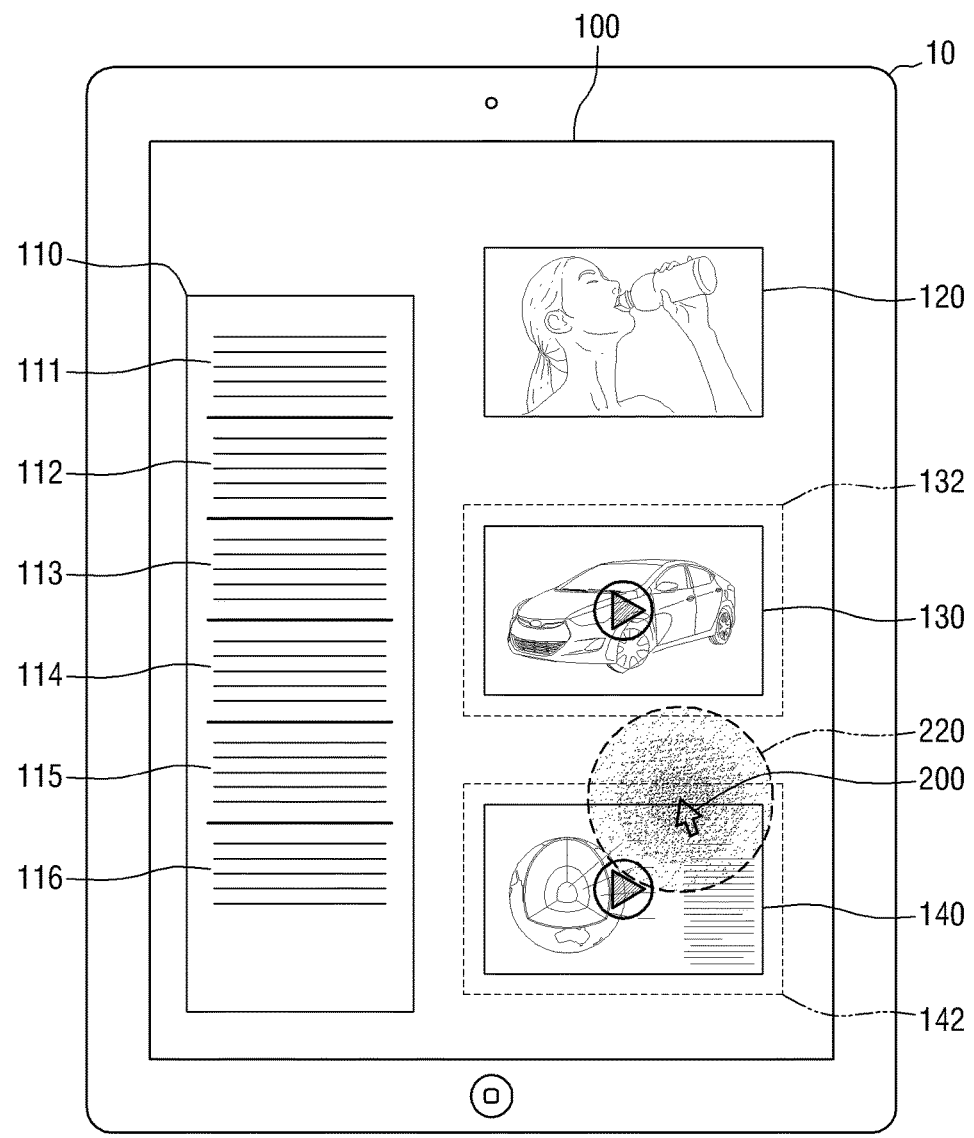

Referring to FIG. 7, whether to perform preloading may be determined according to whether the preload region 220 adjacent to the pointer 200 overlaps preload regions 132 and 142 formed based on regions in which objects are disposed. In the case of FIG. 7, the preload region 220 adjacent to the pointer 200 overlaps both the preload region 132 of the first video object 130 and the preload region 142 of the second video object 140. In this case, if the above state lasts for more than a predetermined period of time, both the first video object 130 and the second video object 140 may be selected as preload targets, or the second video object 140 whose deposition region is overlapped more by the preload region 220 among the first video object 130 and the second video object 140 may be selected to as a preload target. In addition, referring to FIG. 7, if a weight is formed in the preload region 220, the second video object 140 may be selected as a preload target based on a weight corresponding to an overlapping region between preload regions.

According to an embodiment, data preloading may be performed in two or more steps. That is, a part of load target data may be preloaded in a first preloading step, another part of the load target data may be preloaded in a second preloading step, and the other part of the load target data may be preloaded in a third preloading step. In this way, the load target data may be split into multiple parts and then preloaded accordingly. It can be understood that the probability that an object will be selected increases further as multiple preloading steps are performed sequentially. FIG. 5 is a flowchart illustrating the current embodiment.

Figure 8:
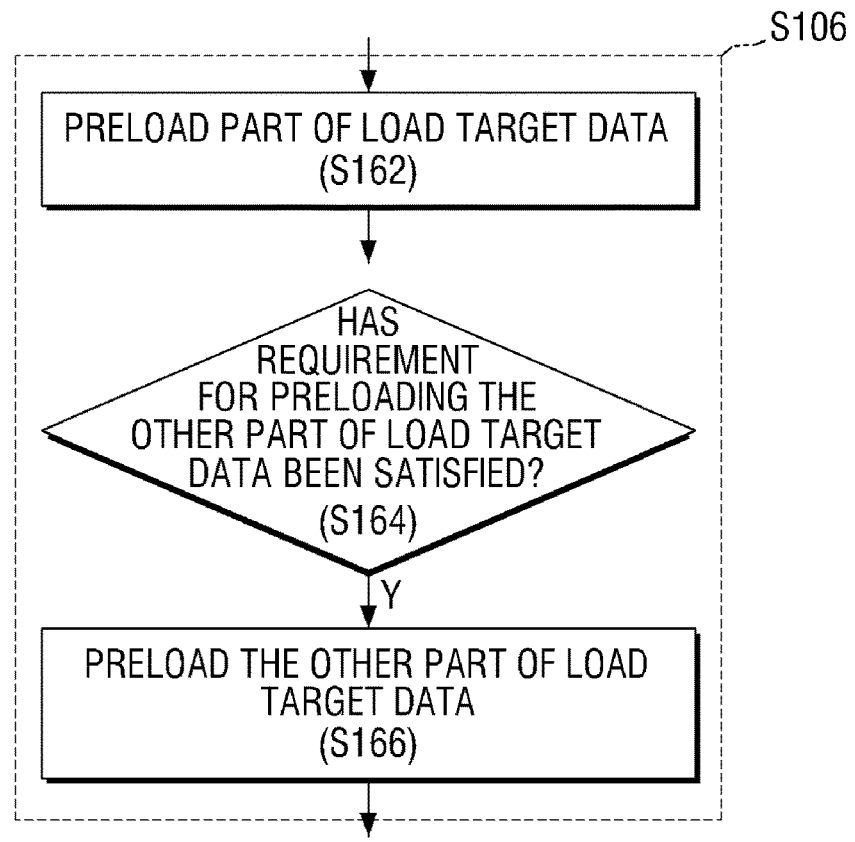
FIG. 8 is a flowchart illustrating the concept of partial preloading in the data preloading method according to an embodiment of the present invention.

Referring to FIG. 8, the preloading of the load target data (operation S106) described above with reference to FIG. 1 is performed in multiple steps. That is, when the preloading of the load target data (operation S106) is initiated, not the whole but only part of the load target data is preloaded (operation S162). In this state, if it is determined that the probability that the selection target object will be selected has increased (operation S164), another part or the other part of the load target data may be preloaded (operation S166).

According to an embodiment, the size of a part of data which is to be preloaded in operation S162 may be determined according to the type of the data. For example, if data is of an image type or a video type, the percentage or size of each part of the data which is to be preloaded may be determined in advance.

In an example, if a pointer stays in a preload region of an object for a first period of time as illustrated in FIG. 2, the preloading of part of the load target data (operation S162) may be initiated. If the pointer stays in the preload region of the object for a second period of time which is longer than the first period of time, the preloading of the other part of the load target data (operation S166) may be initiated.

In another example, if a distance between a pointing device and a touch display is a first distance, the preloading of part of the load target data (operation S162) may be initiated. If the distance between the pointing device and the touch display becomes a second distance which is smaller than the first distance after the pointing device approaches closer to the touch display, the preloading of the other part of the load target data (operation S166) may be initiated.

A data preloading method according to an embodiment of the present invention will now be described with reference to FIGS. 9 through 12.

In the data preloading method according to the current embodiment, a gap between a point tip of a pointing device and a touch display of a user device is measured and analyzed. Then, it is predicted, based on the analysis result, whether a selection target object corresponding to a position pointed at by the pointing device among objects displayed on the touch display will be selected. That is, in the current embodiment, if the position of the pointing device can be identified even if the touch display has not been touched (as in an electromagnetic induction-type), whether a particular object will be selected is predicted using the fact that the pointing device must go through a process of approaching a particular position on the touch display before touching the particular position.

Figure 9:
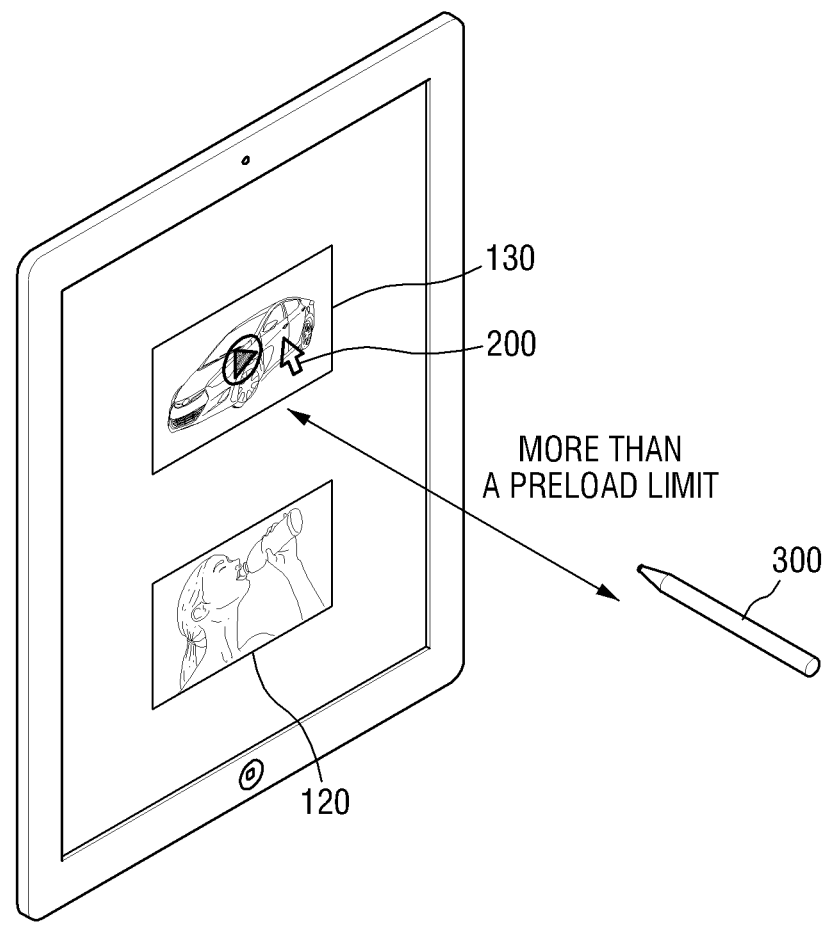
FIGS. 9 through 12 are conceptual diagrams illustrating a method of predicting whether an object will be selected based on a gap between a pointing device and a display in the data preloading method according to an embodiment of the present invention.

First, referring to FIG. 9, if an electromagnetic induction-type pointing device 300 is located within a sensing range of a touch sensor included in a display but located at a distance greater than a predetermined preload limit, a user device may display a pointer 200 on the display.

Figure 10:
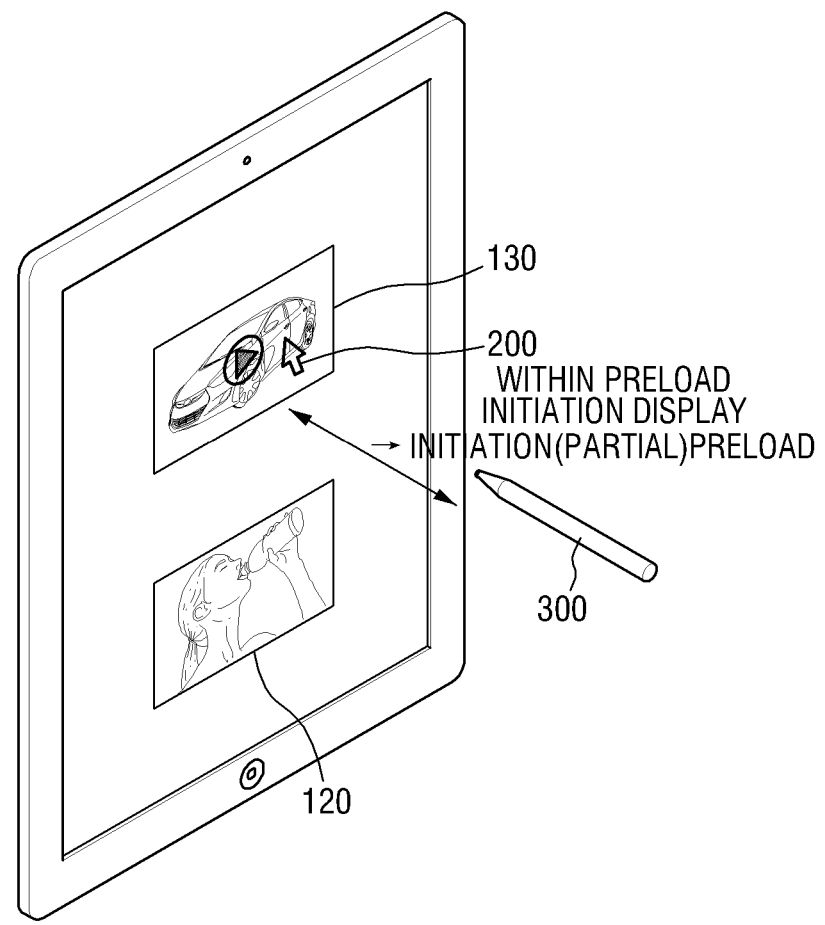

Next, referring to FIG. 10, if the pointing device 300 approaches the display within the preload limit, load target data of a selection target object 130 corresponding to the position of the pointer 200 is preloaded. Here, the whole of the load target data may be preloaded, or only part of the load target data may be preloaded.

Figure 11:
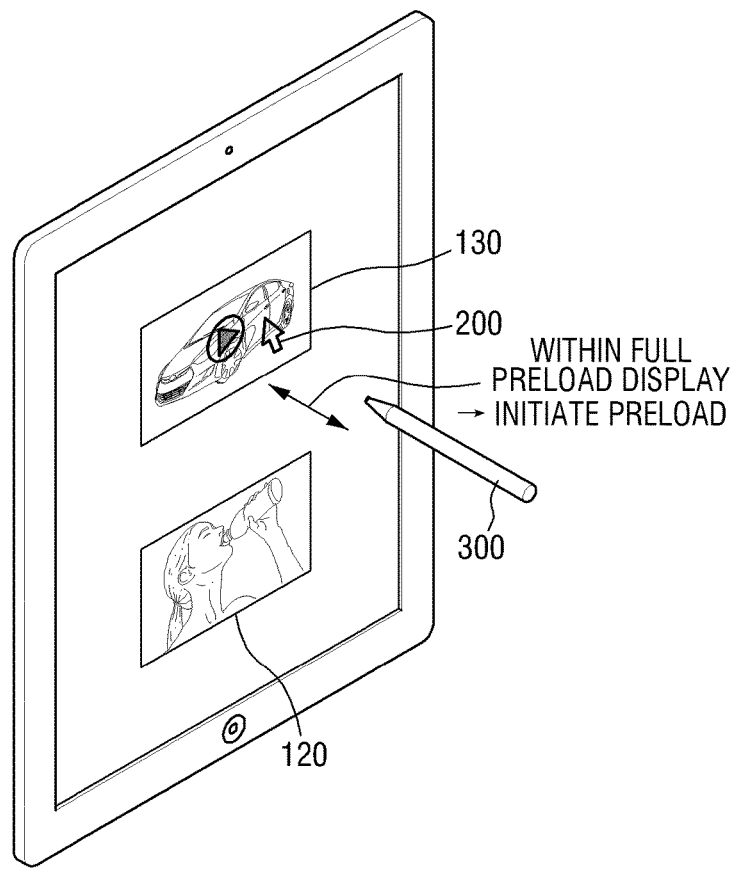

FIG. 11 illustrates a case where the pointing device 300 has approached closer to the display than in FIG. 10. The illustration of FIG. 11 is based on the assumption that partial preloading was performed in FIG. 10. When the pointing device 300 approaches the display within a full preload distance which is smaller than the preload limit, the other part of the load target data of the selection target object 130 corresponding to the position of the pointer 200 may be preloaded.

Figure 12:
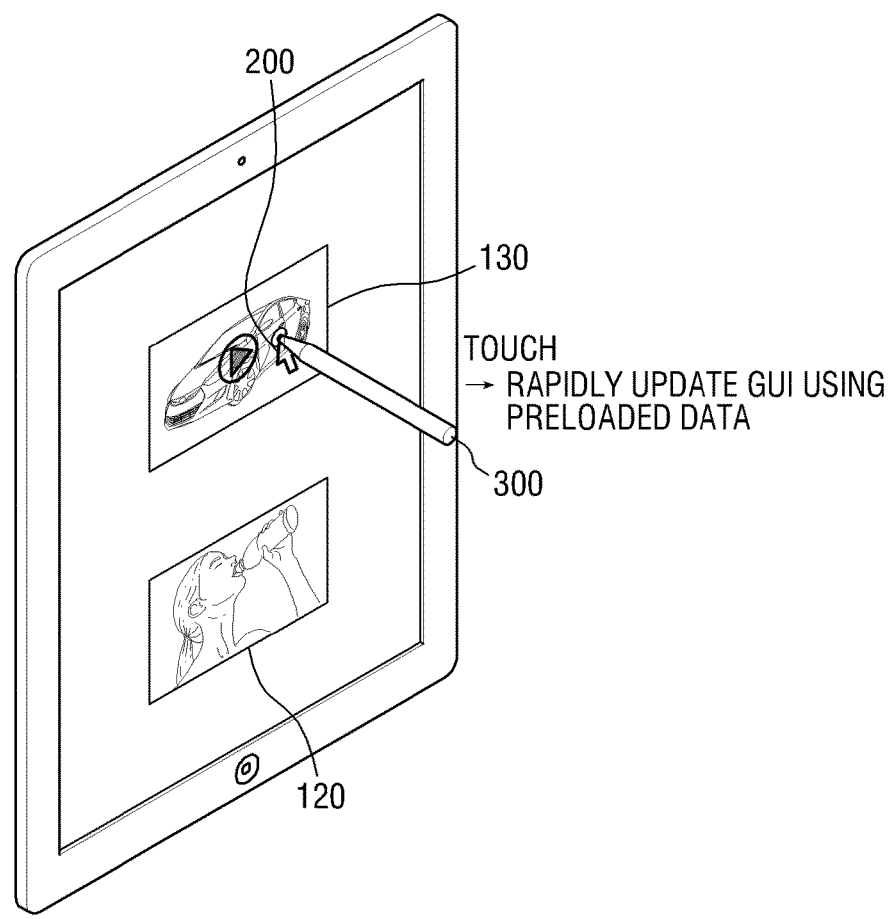

FIG. 12 illustrates a case where a touch signal is generated as the pointing device 300 touches the display. When the selection target object 130 is actually selected as illustrated in FIG. 12, the load target data is not loaded from that time. Instead, the preloaded load target data is accessed immediately. According to an embodiment, the preloaded load target data can be accessed in a cache region allocated to a region of a memory.

When a user device is manipulated using a pointing device that supports a non-contact touch, the operations of FIGS. 9 through 12 may generally be performed sequentially in order to select a particular object included in a GUI. To select a particular object, a display is generally touched at a position where the object is displayed. Therefore, as the pointing device moves toward the display to touch the display, pointer recognition→partial preloading→full preloading→objection selection may generally be performed sequentially. In this case, the current embodiment increases the probability that the preloaded data will actually be accessed.

Unlike in FIGS. 9 through 12, whether to perform preloading may be determined based on the speed of a reduction in the gap between the pointing device 300 and the display according to an embodiment of the present invention. That is, when the speed of the reduction in the gap is greater than a predetermined limit, preloading may be performed.

A data preloading method according to an embodiment of the present invention will now be described with reference to FIG. 13.

In the data preloading method according to the current embodiment, a selection pre-notification signal is received, and load target data of a selection target object corresponding to the selection pre-notification signal is preloaded. According to the current embodiment, a user can explicitly instruct preloading by designating a particular object. For example, in the case of a GUI screen including first through fourth objects, a user may input selection pre-notification signals for the first and third objects which the user is interested in but does not want to open immediately. Therefore, when actually selecting one of the objects, the user can quickly open the selected object through preloaded data.

The data preloading method according to the current embodiment may include receiving a selection pre-notification signal through the manipulation of a pointing device, adding a selection target object corresponding to the selection pre-notification signal to a preload pool, preloading load target data that should be loaded when the selection target object is selected for each selection target object added to the preload pool, and accessing the preloaded data when one of the selection target objects included in the preload pool is selected.

The selection pre-notification signal may be generated using, for example, a pen-type pointing device 302. For example, the selection pre-notification signal may be generated by manipulating buttons provided on the pointing device 302 while the pointing device 302 is placed on particular objects 120 and 130 but not in contact with the particular objects 120 and 130, by quickly shaking a pointer while the pointer is placed on the particular objects 120 and 130, or by quickly adjusting a gap between the pointing device 302 and a display while the pointing device 302 is placed on the particular objects 120 and 130 but not in contact with the particular objects 120 and 130.

Figure 13:
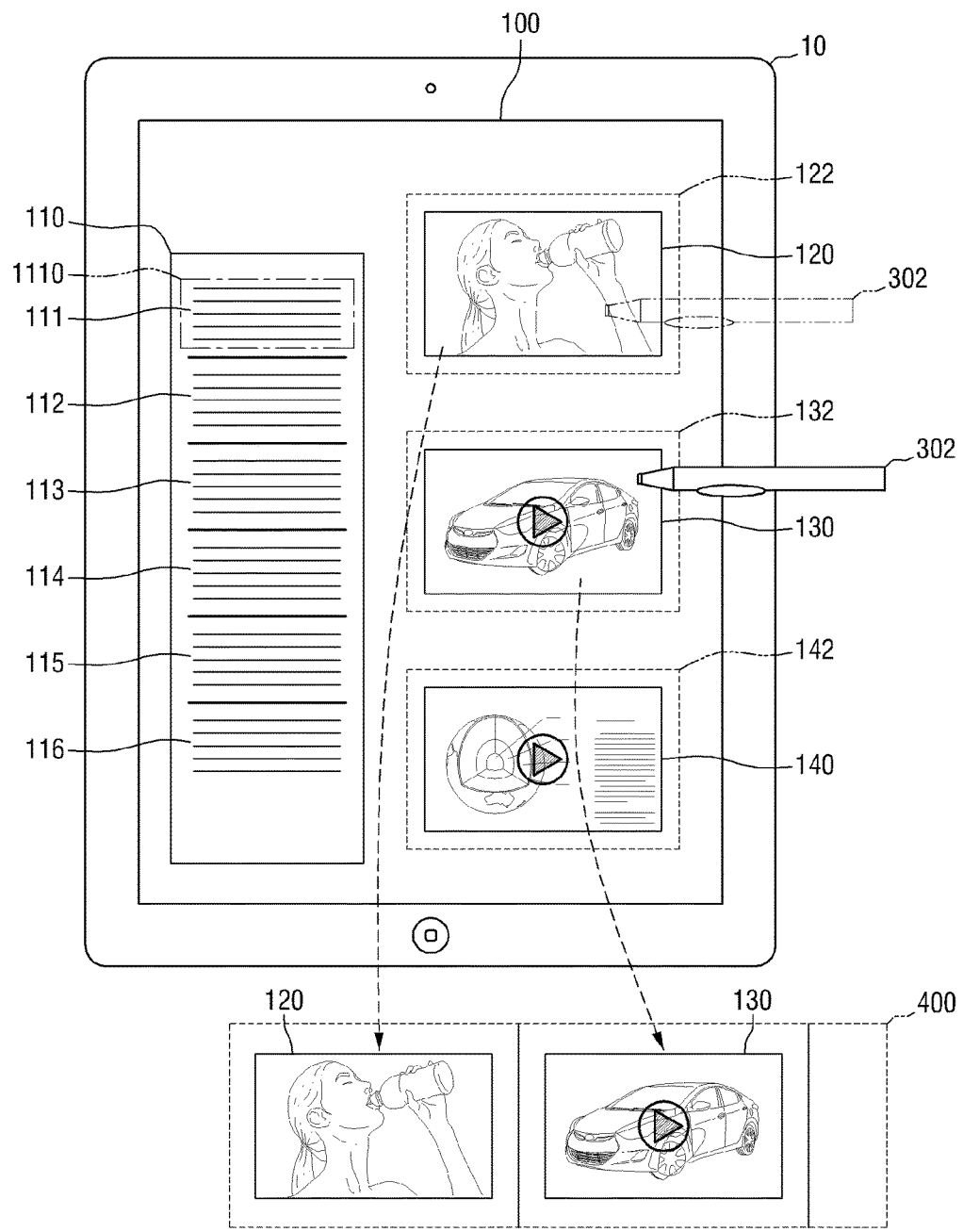
FIG. 13 is a conceptual diagram illustrating a method of operating a preload pool in the data preloading method according to an embodiment of the present invention.

In FIG. 13, a case where two objects 120 and 130 are added to a preload pool in response to selection pre-notification signals for the two objects 120 and 130 is illustrated. The preload pool may be, for example, a region allocated to a specific location in a memory. The preload pool may be a preload cache or a region operated separately from the preload cache.

The preload cache may be operated as a last-in, first-out (LIFO) stack. In addition, load target data inserted into the preload cache may be automatically deleted after a predetermined period of time, so that the preload cache can maintain a sufficient available space. Further, the load target data inserted into the preload cache may be deleted after being accessed.

Figure 14:
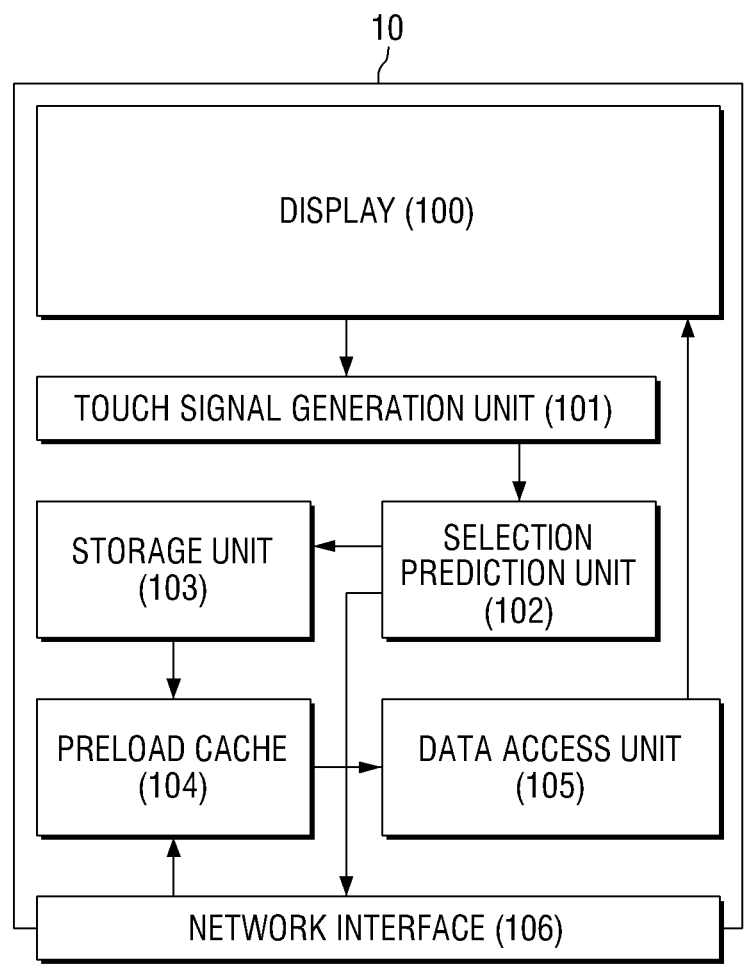
FIG. 14 is a block diagram of a user device according to an embodiment of the present invention.

The configuration and operation of a user device 10 according to an embodiment of the present invention will now be described with reference to FIG. 14. Referring to FIG. 14, the user device 10 according to the current embodiment may include a touch display 100, a selection prediction unit 102, a preload cache 104, and a data access unit 105.

A GUI including one or more selectable objects is displayed on the touch display 100. If an object is selectable, it means that load target data is loaded and processed when the object is selected, resulting in the generation of a new response GUI.

A touch signal generation unit 101 senses a touch input to the touch display 100, converts the sensed touch input into a touch signal, and provides the touch signal to the selection prediction unit 102. The touch signal may be a non-contact touch signal that includes, for example, information about a gap between a display and a pointing device and pointing coordinates.

The selection prediction unit 102 receives the touch signal from the touch signal generation unit 101 and determines which object the touch signal is intended for and whether the touch signal is a selection pre-notification touch input intended for the object. When determining that the touch signal is a selection pre-notification touch input for a selection target object, the selection prediction unit 102 inserts load target data, which should be loaded when the selection target object is selected, into the preload cache 104.

The selection prediction unit 102 may load local data stored in a storage unit 103 and insert the loaded local data into the preload cache 104 or may receive data stored in an external device through a network interface 106 and insert the received data into the preload cache 104.

The selection prediction unit 102 may determine the occurrence of a selection pre-notification touch input when a pointer stays in a preload region of the selection target object for more than a predetermined period of time or when the pointer stays in the preload region of the selection target object for more than the predetermined period of time in a non-contact state. However, the present invention is not limited to the above cases.

The preload cache 104 may be allocated to a predetermined region of a memory of the user device 10.

When the selection target object is selected by a touch on the selection target object displayed on the touch display 100, the data access unit 105 accesses the load target data stored in the preload cache 104 and displays the result of processing the load target data on the touch display 100.

The configuration and operation of a user device 11 according to another embodiment of the present invention will now be described with reference to FIG. 15. Unlike the user device 10 illustrated in FIG. 14, the user device 11 illustrated in FIG. 15 includes a general display 107 instead of the touch display 100. Therefore, the user device 11 of FIG. 15 may receive an input of a pointing device 12 such as a mouse, instead of a touch input.

Figure 15:
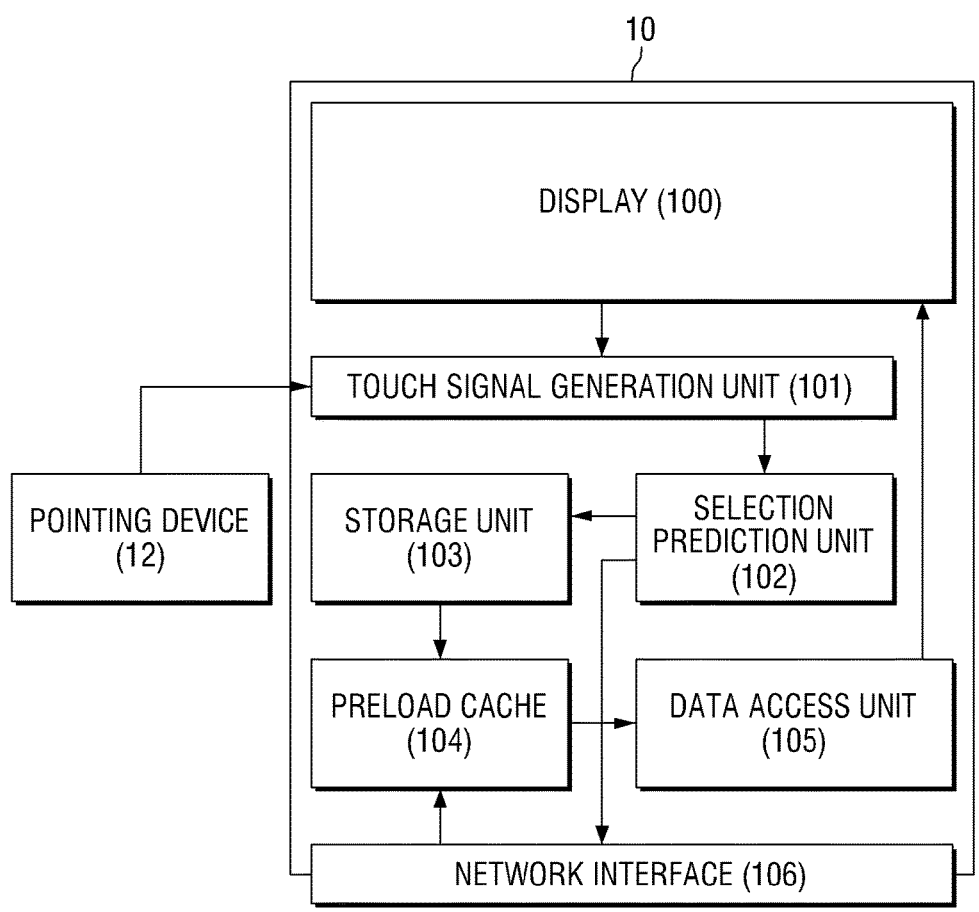
FIG. 15 is a block diagram of a user device according to another embodiment of the present invention.

Referring to FIG. 15, the user device 11 includes a pointing signal generation unit 108 which receives a pointing related input signal from the pointing device 12.

A GUI including one or more selectable objects is displayed on the display 100. If an object is selectable, it means that load target data is loaded and processed when the object is selected, resulting in the generation of a new response GUI.

The pointing signal generation unit 108 receives a pointing related input signal from the pointing device 12 and provides the pointing related input signal to a selection prediction unit 102. The pointing related input signal may be a mouse input signal including, for example, X- and Y-axis coordinates of a pointer.

The selection prediction unit 102 receives the pointing related input signal from the pointing signal generation unit 108, determines a selection target object based on the pointing related input signal, and determines whether to preload the selection target object. That is, the selection prediction unit 102 may receive the pointing related input signal and determine whether to preload the selection target object in view of both a region in which the selection target object is disposed and a pointer position determined based on the pointing related input signal.

To determine a selection target object and determine whether to preload the selection target object, the methods described above with reference to FIGS. 2 through 8 can be used. For example, if the pointer stays in a preload region of a selection target object for more than a predetermined period of time or if a state in which a preload region of the pointer includes at least part of a region in which the selection target object is disposed lasts for more than a predetermined period of time, the selection prediction unit 102 may determine to preload the selection target object.

When determining to preload a selection target object, the selection prediction unit 102 inserts load target data, which should be loaded when the selection target object is selected, into a preload cache 104.

The selection prediction unit 102 may load local data stored in a storage unit 103 and insert the loaded local data into the preload cache 104 or may receive data stored in an external device through a network interface 106 and insert the received data into the preload cache 104.

The preload cache 104 may be allocated to a predetermined region of a memory of the user device 10.

When the selection target object is selected by a touch on the selection target object displayed on the touch display 100, the data access unit 105 accesses the load target data stored in the preload cache 104 and displays the result of processing the load target data on the touch display 100.

Figure 16:
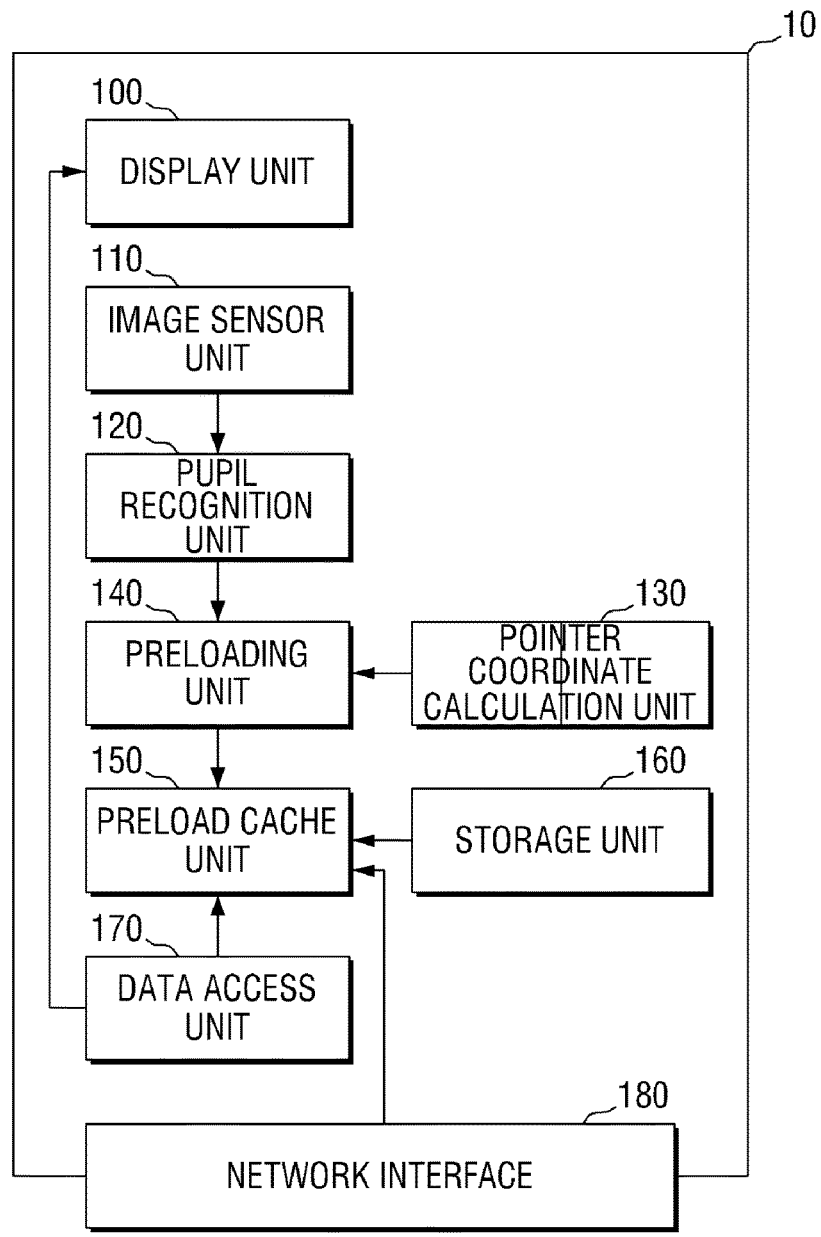
FIG. 16 is a schematic diagram of a user device according to an embodiment of the present invention.

FIG. 16 is a schematic diagram of a user device 10 according to another embodiment of the present invention.

Referring to FIG. 16, the user device 10 according to the current embodiment of the present invention may include a display unit 100, an image sensor unit 110, a pupil recognition unit 120, a preloading unit 140, a pointer coordinate calculation unit 130, a preloading unit 140, a preload cache unit 150, a storage unit 160, a data access unit 170, and a network interface unit 180.

The display unit 100 may be configured to display objects 400 through 430. The display unit 100 may have a display device and include graphic, text, video, GUI, and combinations thereof. The display device may include a liquid crystal display (LCD), a light-emitting polymer display (LPD), an organic light-emitting diode (OLED), an active-matrix organic light-emitting diode (OLED), etc. The display unit 100 may also be configured to receive a touch input from a user. The display unit 100 may include a touch sensor in order to receive a touch input. The touch sensor may sense a touch input of the user using capacitive technology, resistive technology, infrared technology, or surface acoustic wave technology.

The display unit 100 including the touch sensor can support both a touch input for selecting a particular object and a touch input for moving a pointer. A non-contact touch may be when the touch sensor included in the display unit 100 senses a pointing device or finger not in contact with the display unit 100. For example, the non-contact touch may be interpreted as the touch input for moving a pointer, and a contact touch may be interpreted as the touch input for selecting a particular object.

To support the non-contact touch, the display unit 100 may include an electromagnetic induction-type touch sensor, an active capacitance-type touch sensor, or an infrared sensor for sensing the position of a finger in a non-contact touch state.

The objects 410 through 430 as well as the selection target object 400 as an embodiment of the present invention may include various GUIs, and the GUIs may include an object for enlarging an image, an object for reproducing a video, a particular link object in a web page, etc.

The image sensor unit 110 may be configured to obtain a pupil image of a user 660 in order to identify a gaze position 60 of the user 660 which can be recognized by the user device 10 as gaze coordinates. An image sensor included in the image sensor unit 110 may be, but is not limited to, a complementary metal oxide semiconductor (CMOS) sensor. The image sensor unit 110 may be configured to transmit the obtained image to the pupil recognition unit 120.

The pupil recognition unit 120 may be electrically connected to the image sensor unit 110 so as to receive the image of the user 660 obtained by the image sensor unit 110. The pupil recognition unit 120 may recognize and track the pupils in the received image of the user 660 and extract a region of the display unit 100 that the user 660 is gazing at or calculate coordinates. To this end, the pupil recognition unit 120 may include an image processing module (not illustrated). Data about the extracted region or data about the calculated coordinates (hereinafter, referred to as "gaze coordinates," if necessary) may be transmitted to the preloading unit 140 which is electrically connected to the pupil recognition unit 120. A case where the pupil recognition unit 120 calculates gaze coordinates of a user and transmits data about the calculated gaze coordinates to the preloading unit 140 will hereinafter be described, but the present invention is not limited to this case. That is, the pupil recognition unit 120 may be configured to transmit data about a particular gaze region 20 that includes gaze coordinates of a user. A method by which the pupil recognition unit 120 determines the gaze position 60 by recognizing the pupils can be clearly understood by those of ordinary skill in the art from, for example, a method disclosed in Korean Patent Publication No. 2010-0038897, and thus a detailed description thereof is omitted.

The pointer coordinate calculation unit 130 may calculate coordinates of a current pointer position. A pointer according to an embodiment of the present invention may be an electromagnetic induction-type stylus pen. In some embodiments, the pointer may be a cursor. That is, the pointer according to the present invention may denote various input/output (I/O) means (such as a mouse, a stylus pen, a trackball, etc.) used to select the objects 400 through 430. The calculated pointer coordinates may be transmitted to the preloading unit 140 which is electrically connected to the pointer coordinate calculation unit 130.

The preloading unit 140 may perform preloading based on the received gaze coordinates and pointer coordinates.

Preloading according to an embodiment of the present invention may be to insert load target data, which should be loaded when an object (hereinafter, referred to as the "selection target object 400," if necessary) expected to be selected from the objects 400 through 430 by the user 660 according to a pointer position 50 is actually selected, into the preload cache unit 150 if the pointer position 50 stays in any one of preload regions 30 defined for the objects 400 through 430 for more than a predetermined period of time and if the pointer position 50 and the gaze position 60 of the user 600 stay in the same gaze region 20 for more than a predetermined period of time. That is, preloading according to the current embodiment is not performed when only a condition (condition 1) that the pointer position 50 should stay in a preload region 30 for more than a predetermined period of time is met. Preloading is performed when both condition 1 and a condition (condition 2) that the pointer position 50 and the gaze position 60 of a user should stay in the same gaze region 20 for more than a predetermined period of time are met. Preloading according to another embodiment of the present invention may be performed when a predetermined condition for a moving distance A, B or C and a moving direction I, II or III of the gaze position 60 is met if the pointer position 50 and the gaze position 60 are located in different gaze regions 20.

Preloading according to another embodiment of the present invention may be performed by further reflecting the moving speed of the pointer. For example, preloading may be performed when the condition (condition 2) that the pointer position 50 and the gaze position 60 of a user should stay in the same gaze region 20 for more than a predetermined period of time and a condition (condition 3) related to the moving speed of the pointer are met. For example, condition 3 may be that the moving speed of the pointer should increase to more than a predetermined preload reference speed or that the moving speed of the pointer should decrease to less than the predetermined preload reference speed.

Preloading according to another embodiment of the present invention will be described in detail later with reference to FIGS. 22 through 24.

The preloading unit 140 may perform preloading by determining whether the gaze position 60 and the pointer position 50 exist in the same gaze region 20. The preloading unit 140 may be configured to determine whether to perform preloading by comparing set data of the gaze region 20, coordinate data of the gaze position 60, and coordinate data of the pointer position 50. Coordinate data of the gaze region 20 may be preset or arbitrarily set by the user 660. In addition, the number of gaze regions 20 may be preset or arbitrarily set by the user 660.

If the gaze position 60 and the pointer position 50 stay in the same gaze region 20 for a predetermined period of time, the preloading unit 140 may preload target object data. If target object data of the selection target object 400 is stored in the storage unit 160, that is, if the target object data is local data, the preloading unit 140 may load the target object data from the storage unit 160 from the storage unit 160 and insert the loaded target object data into the preload cache unit 150. If the target object data is not local data, the preloading unit 140 may access a network through the network interface 180, receive target object data from a specific external device, and insert the received target object data into the preload cache unit 150.

According to an embodiment, when a distance between the gaze position 60 determined by gaze coordinates and the pointer position 50 decreases to less than a predetermined limit distance, the preloading unit 140 may preload the target object data that should be loaded when the selection target object 400 is selected.

The preload cache unit 150 may be configured to store target object data preloaded by the preloading unit 140. The preloading unit 140 may be operated as a LIFO stack. In addition, load target data inserted into the preload cache unit may be automatically deleted after a predetermined period of time, so that the preload cache unit 150 can maintain a sufficient available space. In addition, the load target data inserted into the preload cache unit 150 may be deleted after being accessed.

The storage unit 160 may be a storage medium which stores the target object data of the selection target object 400. As described above, the target object data may be local data stored in the storage unit 160 or data that should be received from an external device through the network interface 180. The storage unit 160 may include, but not limited to, a hard disk drive (HDD), an SSD, a tape drive, an optical drive, a redundant array of inexpensive disks (RAID), a random access memory (RAM), and a read-only memory (ROM).

When the selection target object 400 displayed on the display unit 100 is selected, the data access unit 170 may access the load target data stored in the preload cache unit 150 and display the result of processing the load target data on the display unit 100.

Figure 17:
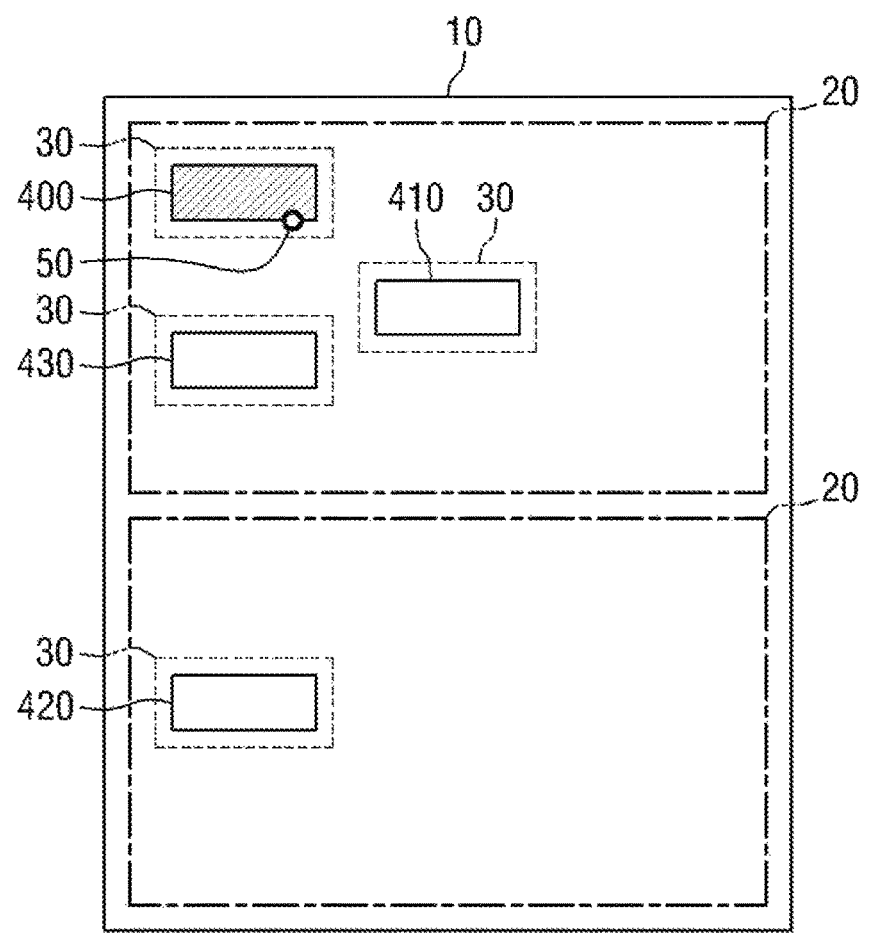
FIGS. 17 and 18 schematically illustrate objects, preload regions, a pointer position, and gaze regions according to an embodiment of the present invention.
Figure 18:
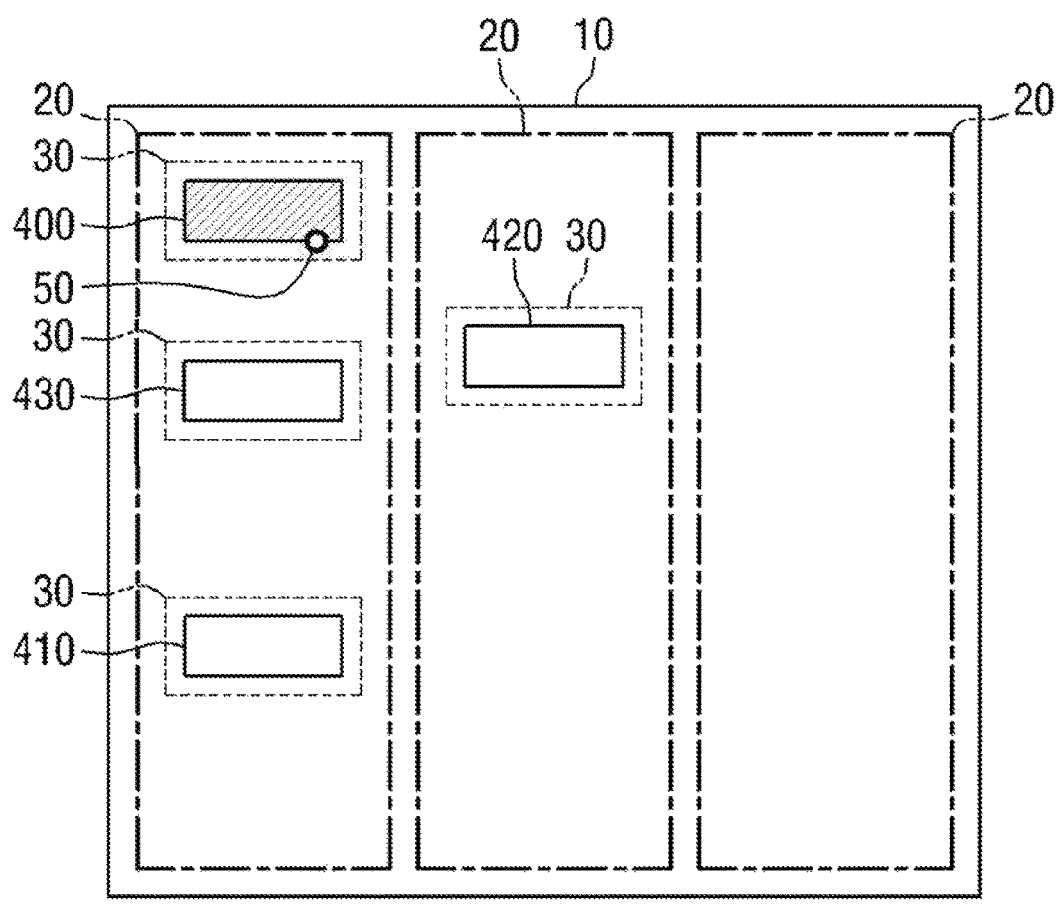

FIGS. 17 and 18 schematically illustrate objects 410 through 430, a selection target object 400, preload regions 30, and gaze regions 20 according to an embodiment of the present invention.

Referring to FIGS. 17 and 18, each of the objects 400 through 430 including the selection target object 400 may include the preload region 30 defined therefor. The preload region 30 according to an embodiment of the present invention may be a region in which each of the objects 400 through 430 is displayed. If a selection input, such as a mouse click or a touch, is made within this region, the preload region 30 may be the same as a disposition region in which the selection input for a particular object is processed. The preload region 30 can be enlarged or reduced within a predetermined range from the disposition region.

The gaze regions 20 according to an embodiment of the present invention may be another criterion for performing preloading. That is, the gaze regions 20 may be set to perform preloading in view of not only a pointer position 50 but also a gaze position 60 of a user 660 in order to more accurately identify the intent of the user 660 to select the selection target object 400. In FIGS. 17 and 18, two or three gaze regions 20 are illustrated. However, the positions and number of the gaze regions 20 are not limited to the examples of FIGS. 17 and 18. That is, four gaze regions 20 or five gaze regions 20 can be set. In addition, the gaze regions 20 can be set in a horizontal direction or a vertical direction. The number or disposition direction of the gaze regions 20 may be preset or may be arbitrarily set by the user 660. As illustrated in FIG. 18, a gaze region 20 may include or may not include the objects 400 through 430.

Figure 19:
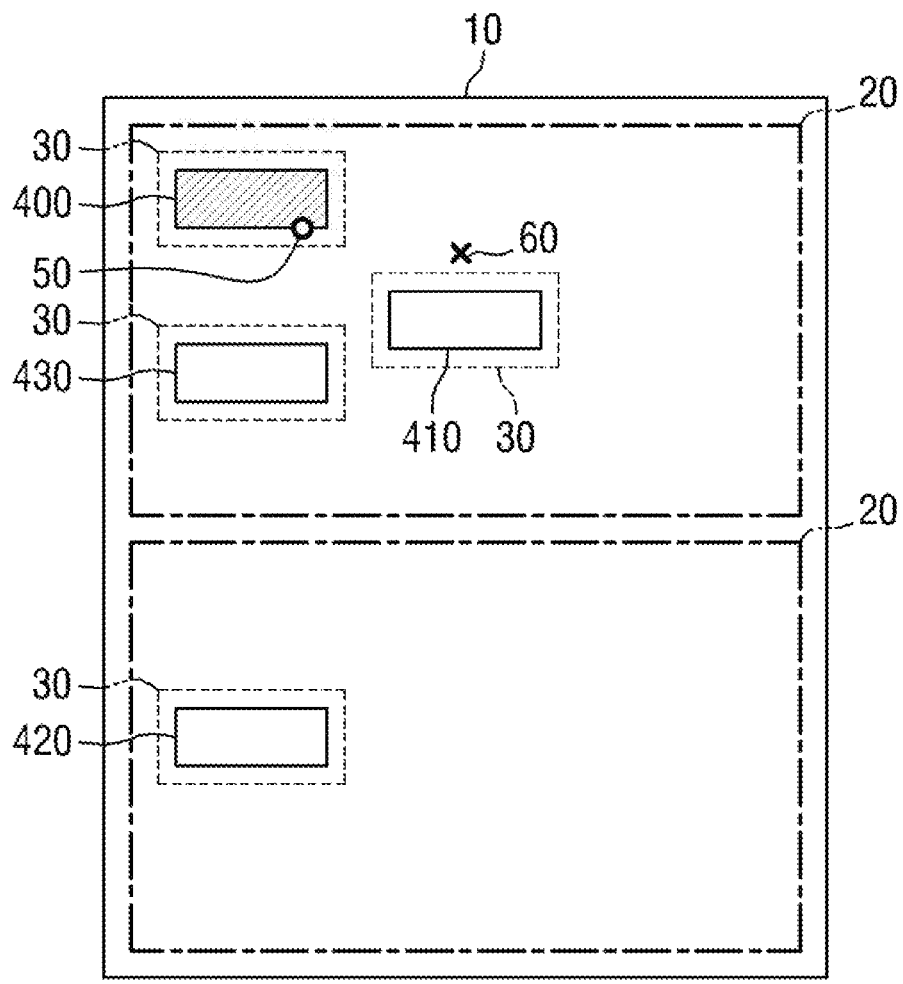
FIGS. 19 and 20 schematically illustrate a case where a pointer position and a gaze position exist in the same gaze region according to an embodiment of the present invention.
Figure 20:
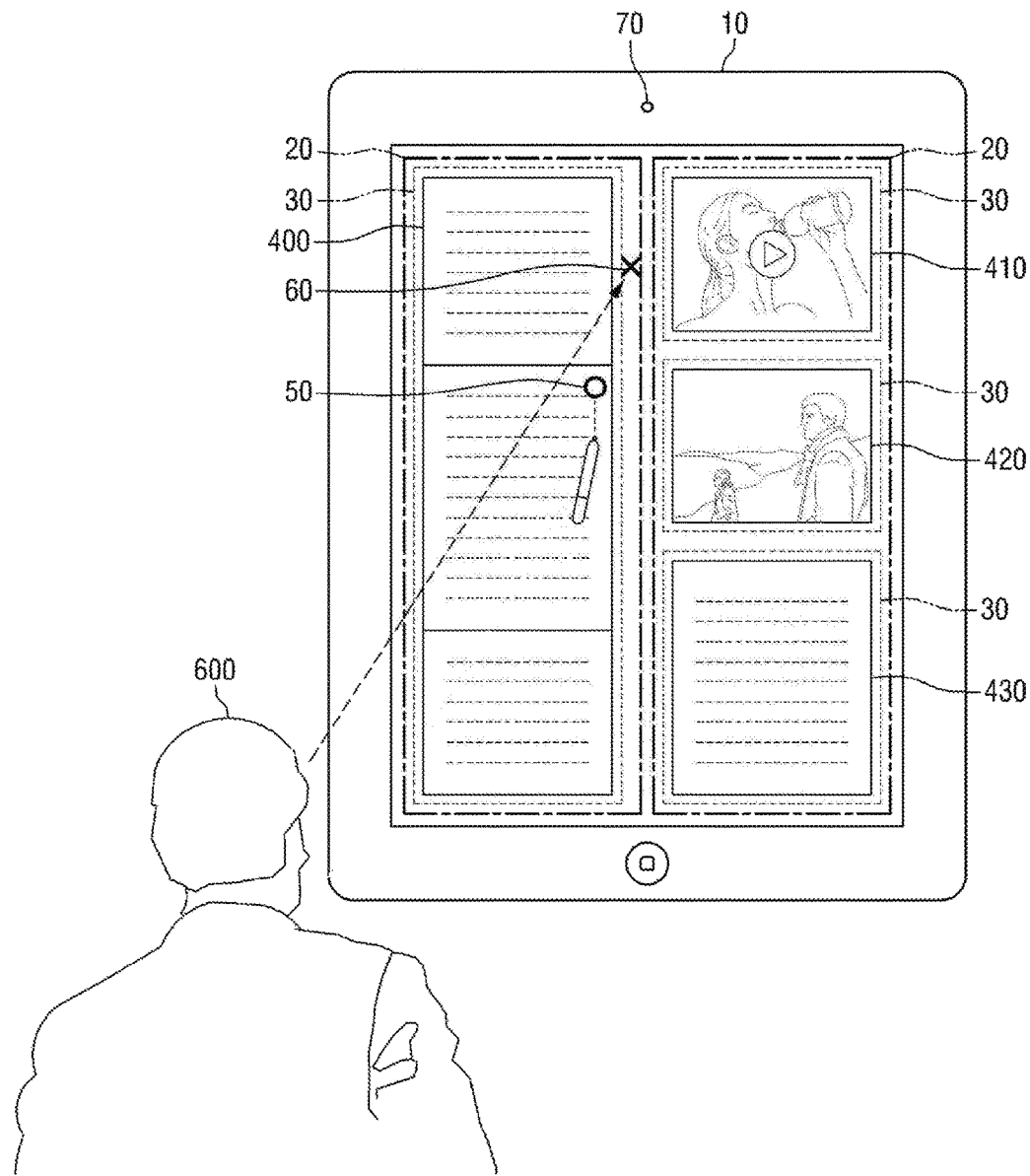

FIGS. 19 and 20 schematically illustrate a case where a pointer position 50 and a gaze position 60 exist in the same gaze region 20 according to an embodiment of the present invention.

Figure 21:
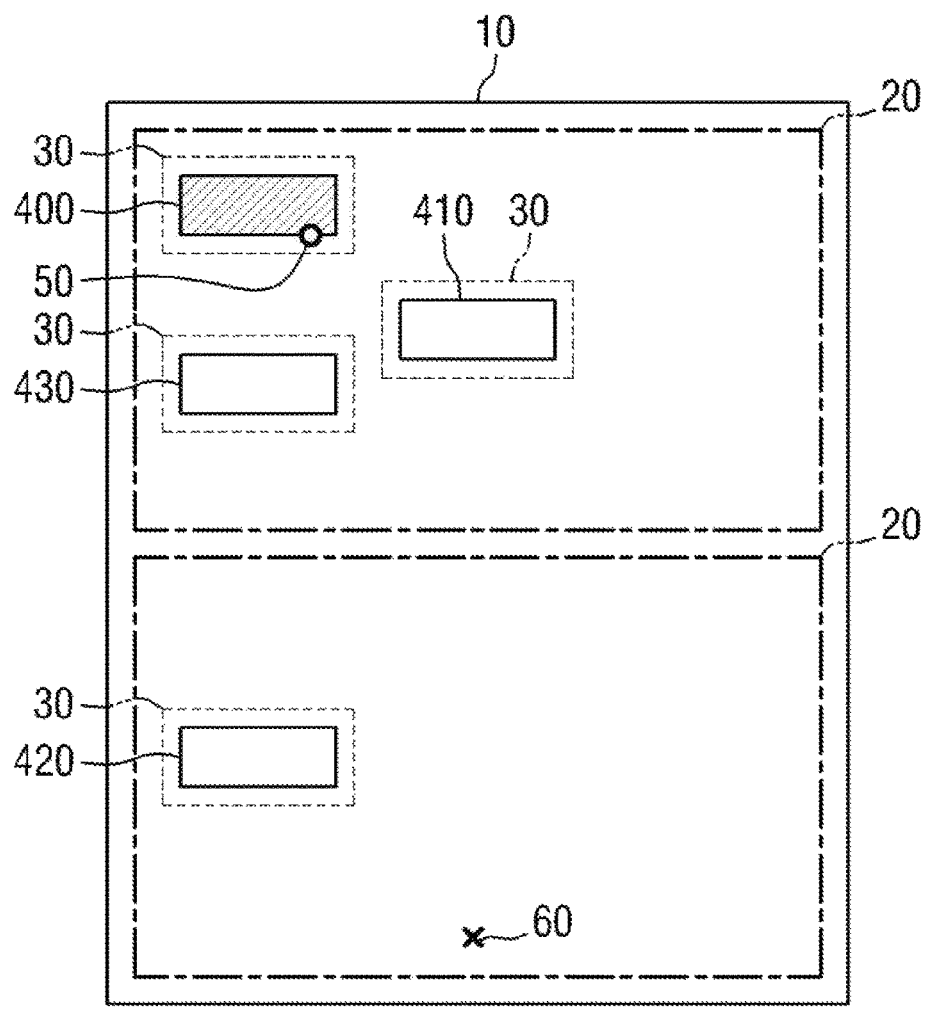
FIG. 21 schematically illustrates a case where a pointer position and a gaze position exist in different gaze regions according to an embodiment of the present invention.

Referring to FIGS. 19 and 20, if the pointer position 50 and the gaze position 60 of a user 660 exist in the same gaze region 20, the preloading unit 140 may preload a selection target object 400. Since the intent of the user 660 to select the selection target object 400 is identified accurately in view of not only the pointer position 50 but also the gaze position 60 of the user 660, unnecessary preloading can be avoided, thereby reducing battery or computing power. In FIG. 21, a tablet PC using a stylus pen as a pointing device is illustrated as an embodiment of the present invention. The stylus pen may be of an electromagnetic induction type. Various objects 400 through 430 may be displayed on the screen of the tablet PC. Since the gaze position 60 of the user 660 and the pointer position 50 on the selection target object 400 are included in the same gaze region 20, the preloading unit 140 may preload the selection target object 400.

FIG. 21 schematically illustrates a case where a pointer position 50 and a gaze position 60 exist in different gaze regions 20 according to an embodiment of the present invention. FIGS. 22 through 24 schematically illustrate conditions for performing preloading in a case where the pointer position 50 and the gaze position 60 exist in different gaze regions 20 according to an embodiment of the present invention.

Referring to FIG. 21, a selection target object 400 exists in an upper one of two gaze regions 20, and a gaze position 60 is located in a lower one of the two gaze regions 20. If this state is maintained continuously, the preloading unit 140 may not basically preload the selection target object 400. However, even if the gaze position 60 and the pointer position 50 are not included in the same gaze region 20, the preloading unit 140 may be configured to perform preloading based on a moving direction I, II or III and a moving distance A, B or C of the gaze position 60 of a user 660. That is, as another embodiment for performing preloading, if the moving direction I, II or III of the gaze position 60 is toward a gaze region 20 in which the pointer position 50 is located and if the moving distance A, B or C of the gaze position 60 is more than a predetermined distance, the preloading unit 140 may be configured to perform preloading even if the gaze position 60 and the pointer position 50 are not included in the same gaze region 20.

Figure 22:
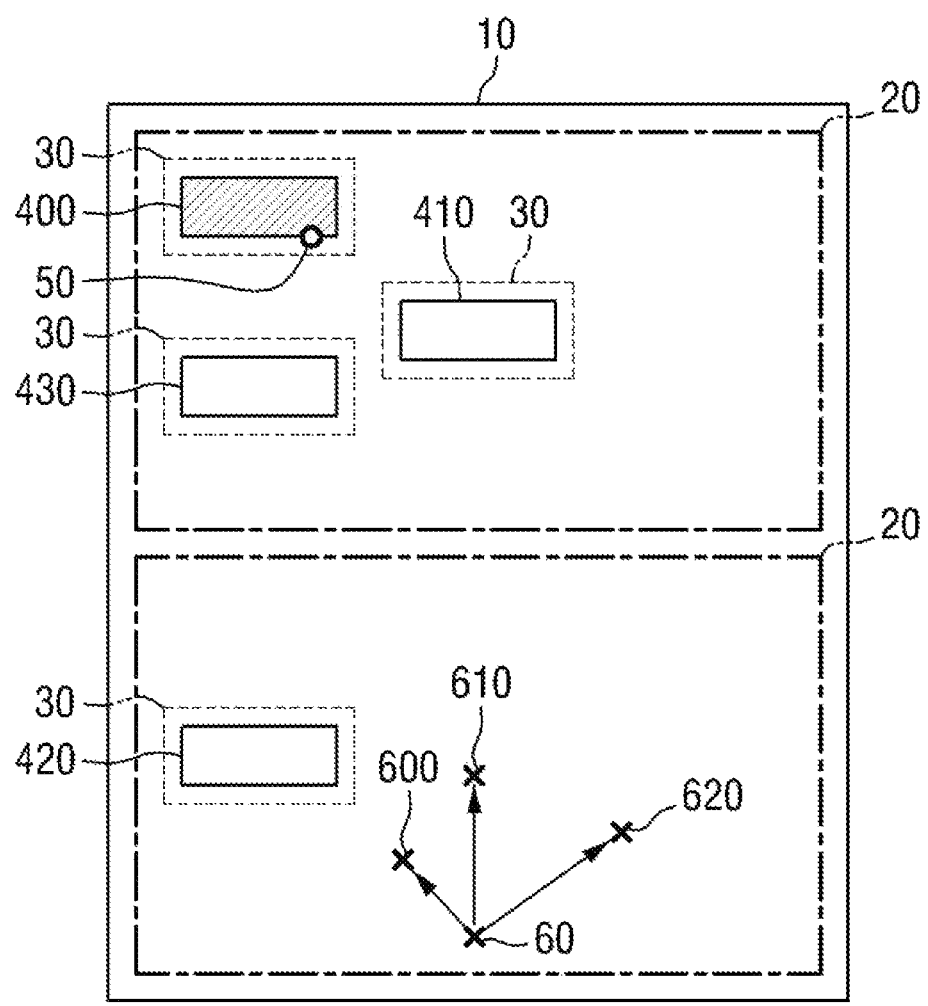
FIGS. 22 through 24 schematically illustrate conditions for performing preloading in a case where a pointer position and a gaze position exist in different gaze regions according to an embodiment of the present invention.

For example, referring to FIG. 22, even if the gaze position 60 and the pointer position 50 are located in different gaze regions 20, the preloading unit 140 may perform preloading if the gaze position 60 has moved more than a predetermined distance toward a gaze region 20 in which the pointer position 50 is included. That is, preloading can be performed only when a condition for the moving direction I, II or III and a condition for the moving distance A, B or C are met. Therefore, the condition for the moving direction I, II or III and the condition for the moving distance A, B or C will now be described.

Figure 23:
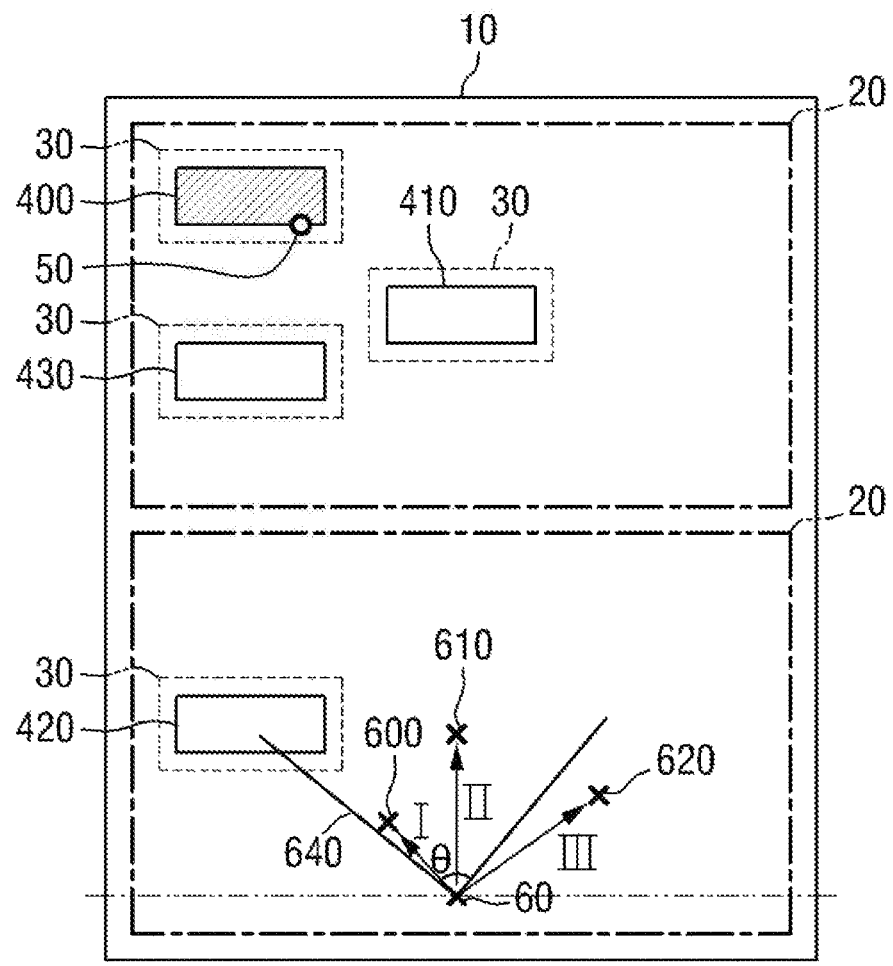

FIG. 23 schematically illustrates a criterion for the moving direction I, II or III of the gaze position 60. Referring to FIG. 23, there may be various moving directions I through III of the gaze position 60. However, the moving direction I, II or III for preloading of the preloading unit 140 may be determined based on a preset angle range θ. For example, the preset angle range θ may be 45 degrees from a first baseline 640. In this case, if an angle formed by a line extending from a new gaze position 60 after a movement from the current gaze position 60 and a first baseline 640 is less than 45 degrees, the gaze position 60 may be processed as being in a direction toward a gaze region 20 in which the pointer position 50 is located. In FIG. 23, since the directions I and II are included in the preset angle range θ, they may be processed as directions for performing preloading. However, since the direction III is outside the preset angle range θ, it may not be processed as a direction for performing preloading.

Figure 24:
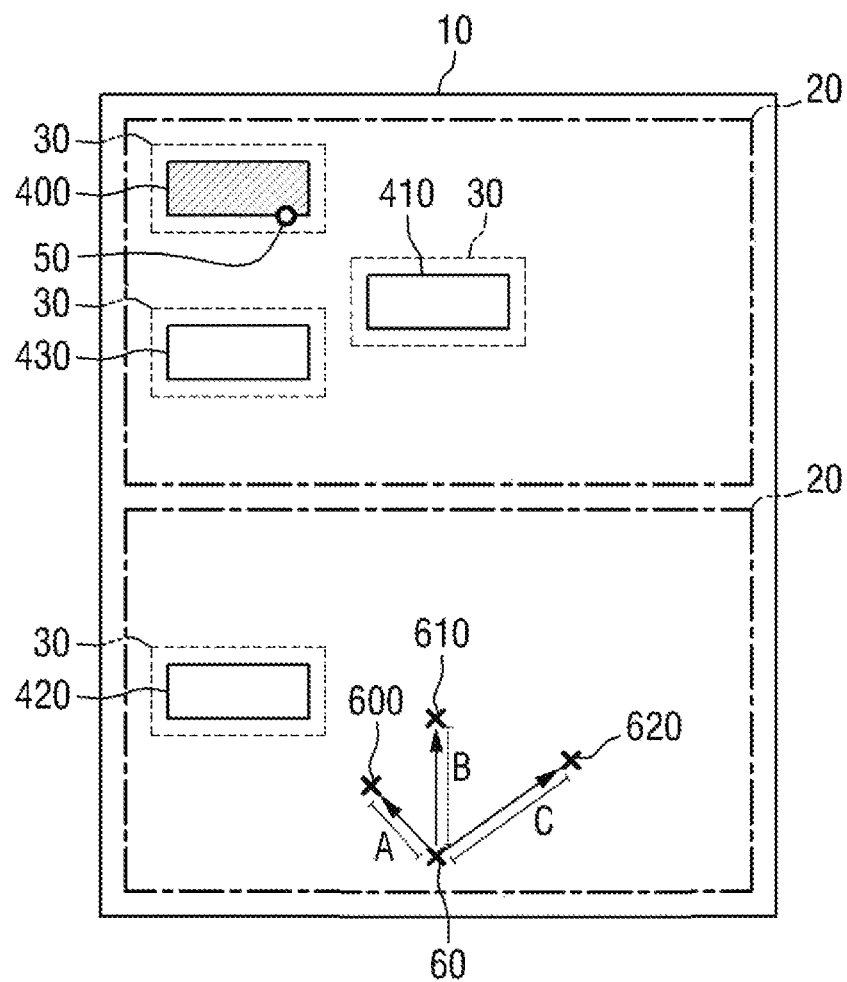

FIG. 24 schematically illustrates a criterion for the moving distance A, B or C of the gaze position 60. Referring to FIG. 24, a moving distance for performing preloading may also be a preset value. For example, preloading may not be performed in the case of the moving distance A because the moving distance A does not meet the moving distance condition although a moving direction I corresponding to the moving distance A is included in an angle range θ for performing preloading. That is, the preloading unit 140 may perform preloading only at a gaze position 610 that meets both the moving distance condition and the moving direction condition. However, this is merely an embodiment of the present invention, and the preloading unit 140 can be configured to perform preloading when any one of the moving distance condition and the moving direction condition is met.

Figure 25:
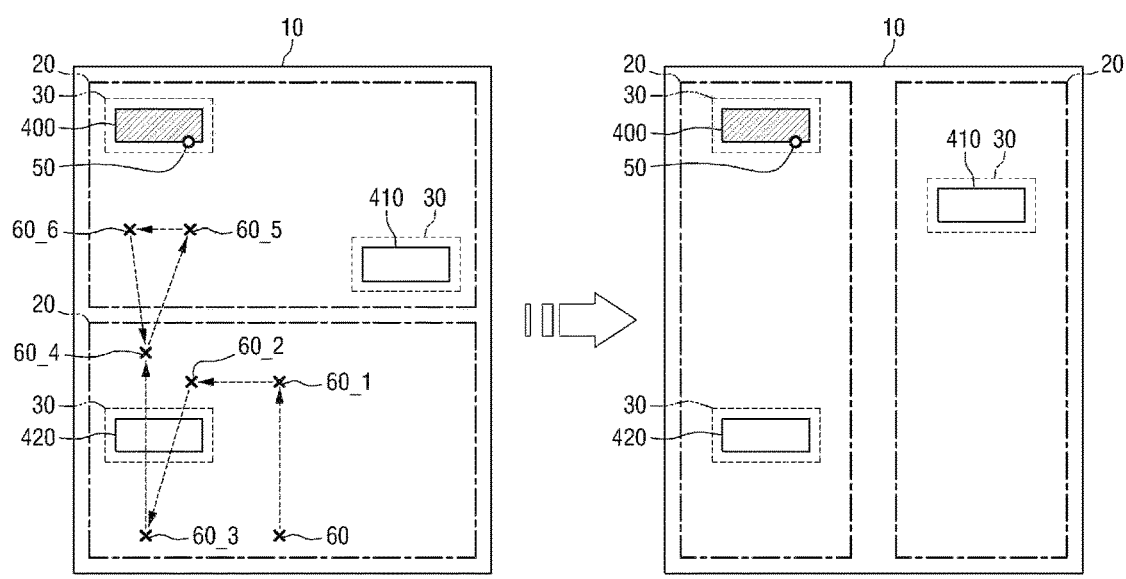
FIG. 25 schematically illustrates an embodiment in which gaze regions according to an embodiment of the present invention are dynamically set.

FIG. 25 schematically illustrates an embodiment in which gaze regions 20 according to an embodiment of the present invention are dynamically set.

Referring to FIG. 25, when the user 660 gazes at only a particular part of the display unit 100, the gaze regions 20 may be dynamically determined in order to reflect the intent of the user 660 more actively. To this end, the user device 10 may include a gaze recording unit (not illustrated) which records a movement history of the gaze position 60, a gaze movement pattern determination unit (not illustrated) which determines a gaze movement pattern using data recorded in the gaze recording unit, and a region personalization unit which places the gaze regions 20 according to the determined gaze movement pattern. In FIG. 25, for example, the gaze position 60 is concentrated on a left side. The gaze recording unit may record this movement history of the gaze position 60, and the gaze movement pattern determination unit may determine that the gaze regions 20 should be placed in a vertical direction rather than in a horizontal direction using the data recorded by the gaze recording unit. Based on the determination result, the region personalization unit may change the placement of the gaze regions 20 to the vertical direction in real time.

Figure 26:
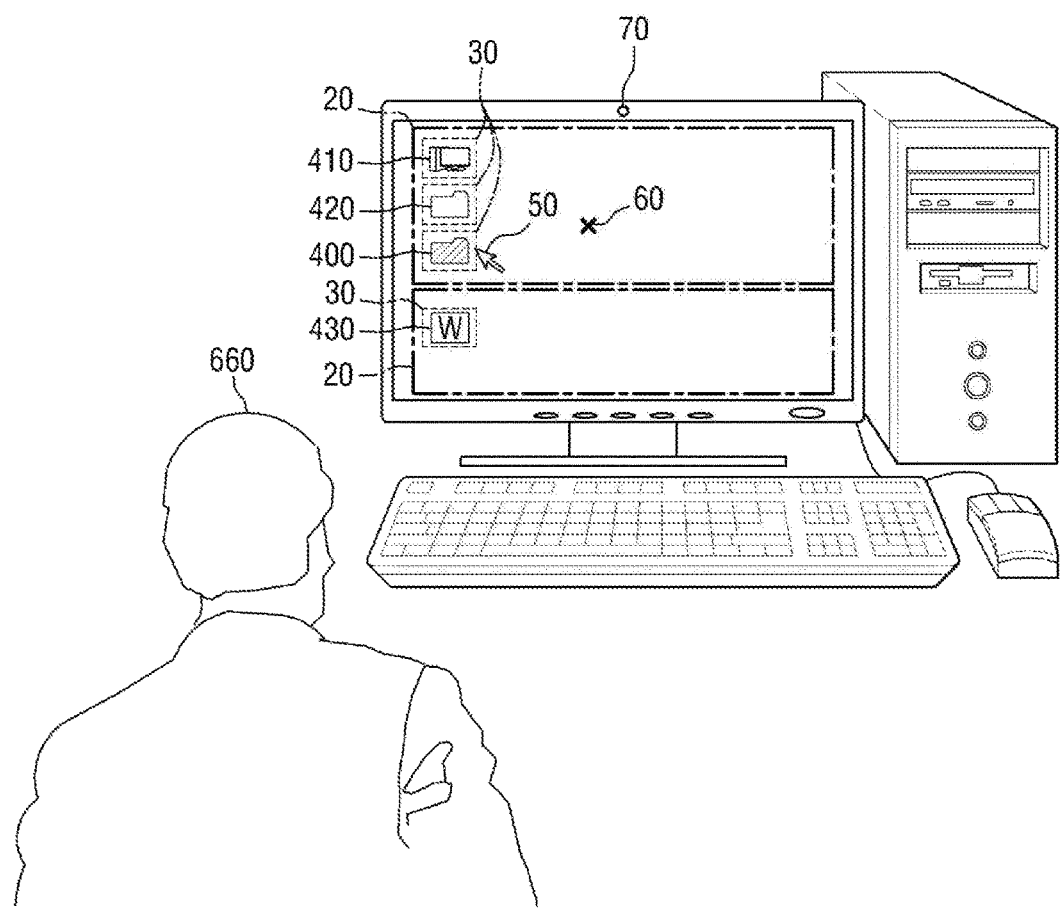
FIG. 26 schematically illustrates a case where a user device according to another embodiment of the present invention performs preloading.

FIG. 26 schematically illustrates a case where a user device 10 according to another embodiment of the present invention performs preloading.

Referring to FIG. 26, the present invention may be applied to a personal computer as another embodiment of the user device 10 of the present invention. In this case, a pointer may be configured as a mouse, and a pointer position 50 may be defined by a cursor. The above-described embodiments of the present invention can be applied the same to the personal computer which is another embodiment of the user device 10.

Figure 27:
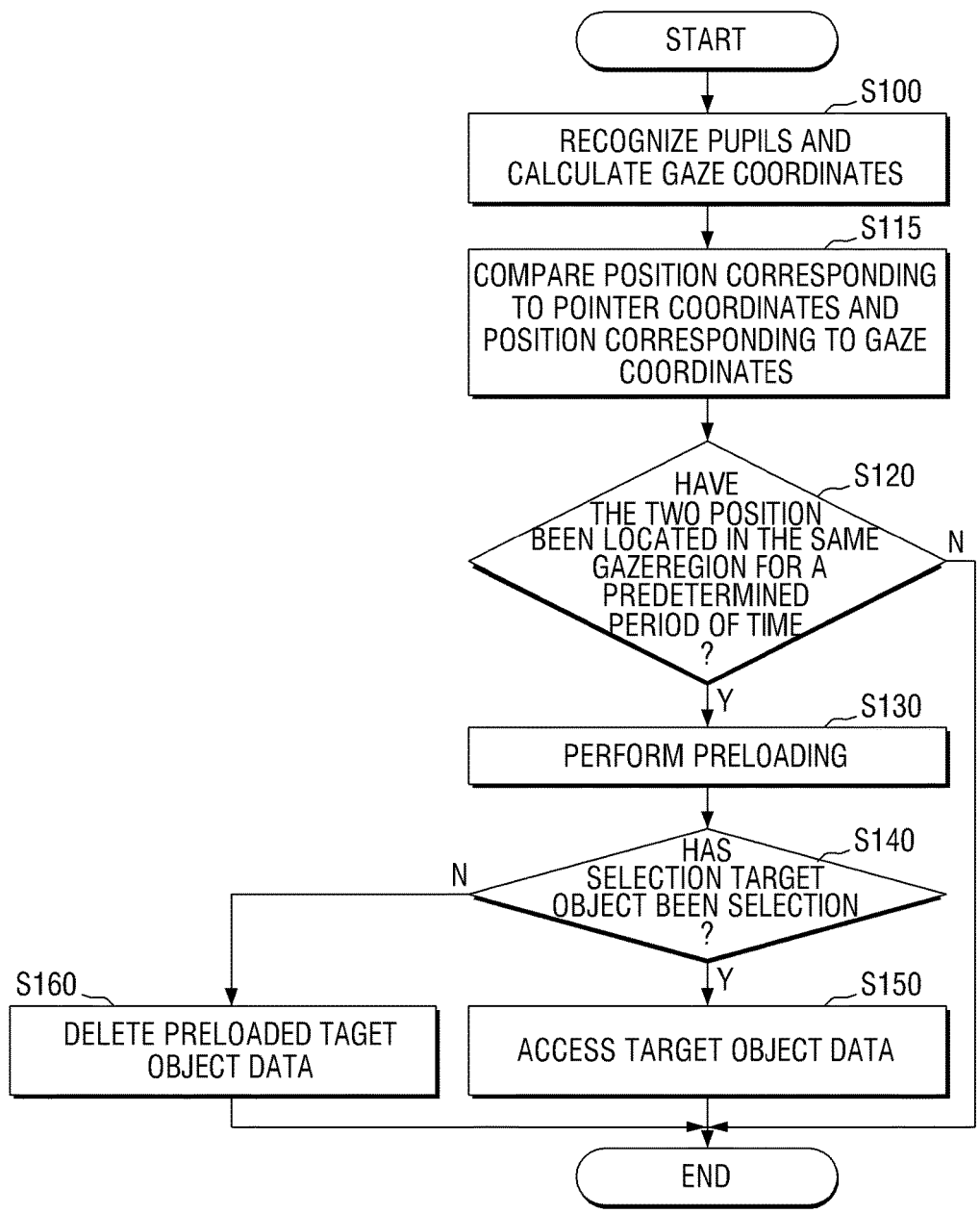
FIG. 27 is a flowchart illustrating preloading performed in a case where a pointer position and a gaze position exist in the same gaze region according to an embodiment of the present invention.

FIG. 27 is a flowchart illustrating preloading performed in a case where a pointer position 50 and a gaze position 60 exist in the same gaze region 20 according to an embodiment of the present invention.

Referring to FIG. 27, a user device 10 may recognize the pupils of a user 660 and calculate gaze coordinates (operation S100). Then, a pointer position 50 corresponding to pointer coordinates and a gaze position 60 corresponding to the gaze coordinates may be compared (operation S115) to determine whether the two positions 50 and 60 are located in the same gaze region 20 (operation S120). If the two positions 50 and 60 are located in the same gaze region 20, preloading may be performed (operation S130). Then, it may be determined whether a selection target object 400 has been selected by the user 660 (operation S140). If the selection target object 400 has been selected by the user 660, target object data may be accessed (operation S150). If the selection target object 400 has not been selected, the preloaded target object data may be deleted (operation S120).

Figure 28:
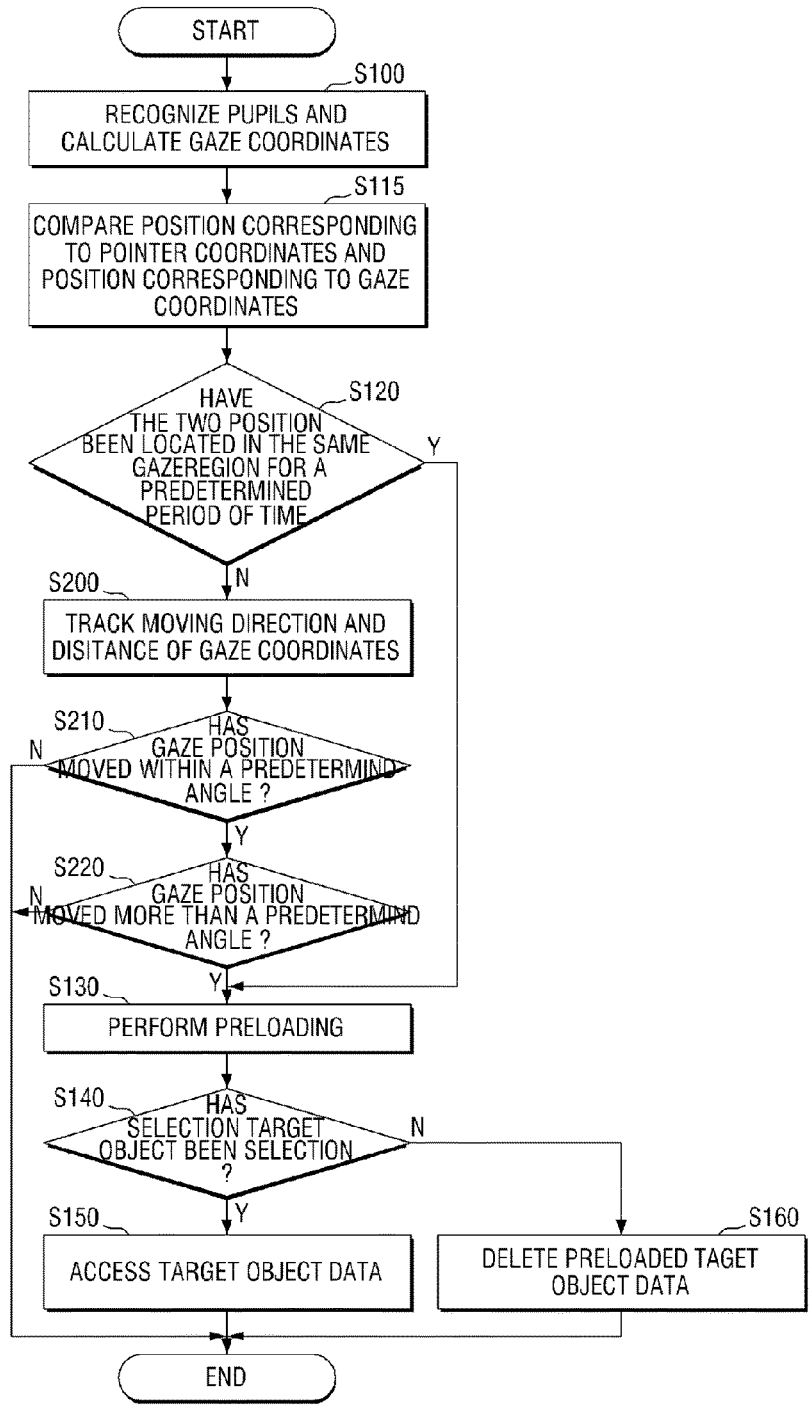
FIG. 28 is a flowchart illustrating preloading performed in a case where a pointer position and a gaze position exist in different gaze regions according to an embodiment of the present invention.

FIG. 28 is a flowchart illustrating preloading performed in a case where a pointer position 50 and a gaze position 60 exist in different gaze regions 20 according to an embodiment of the present invention.

Referring to FIG. 28, a user device 10 may recognize the pupils of a user 660 and calculate gaze coordinates of the recognized pupils (operation S100). Then, a pointer position 50 corresponding to pointer coordinates and a gaze position 60 corresponding to the gaze coordinates may be compared. That is, it may be determined whether the two positions 50 and 60 are located in the same gaze region 20 or different gaze regions 20 (operation S115). If the two positions 50 and 60 are located in the same gaze region 20 for a predetermined period of time (operation S120), preloading may be performed for a selection target object 400 (operation S130). However, if the two positions 50 and 60 are located in different gaze regions 20, it may be determined whether the gaze position 60 has moved within a predetermined angle (operation S210) and whether the gaze position 60 has moved more than a predetermined distance (operation S220). That is, if it is determined that the gaze position 60 of the user 660 is moving in a direction toward a gaze region 20 in which the pointer position 50 is located, preloading may be performed (operation S130). If the user 660 selects the selection target object 400, preloaded target object data may be accessed (operation S150). If the user 660 does not select the selection target object 400, the preloaded target object data may be deleted (operation S160).

A data preloading method according to an embodiment of the present invention will now be described. In the data preloading method according to the current embodiment, whether an input pattern of a user device 10 corresponds to a selection pattern is determined in real time based on probability.

The selection pattern denotes a user input pattern when a user selects a particular icon, link, etc.

First, parameter data about an input pattern is collected.

Element data that constitute the input pattern may include coordinates of a pointer, the initial moving speed of the pointer, the accelerated moving speed of the pointer, and the timing of a selection input.

Since an input pattern when a selection input (click or touch) for an icon or a link is made will be distinguished from an input pattern when the selection input is not made, the collected parameter data may be divided into a cluster indicating a selection pattern and a cluster indicating a non-selection pattern by using a clustering algorithm. The clustering algorithm may be a generalized algorithm such as k-means clustering or neutral network.

The parameter data may be generated by collecting input patterns of multiple users. In this case, since the input patterns of the multiple users are used, generally applicable parameter data can be generated.

Alternatively, the parameter data may be generated based on an input pattern of a particular user only. In this case, a selection prediction optimized for the input pattern of the particular user can be made. Since the parameter data can be accumulated continuously, the input pattern of the particular user may be learned. Therefore, even if the input pattern for the user device 10 is changed, a selection prediction can be made according to the changed input pattern.

Next, a mathematical model representing each of the cluster indicating the selection pattern and the cluster indicating the non-selection pattern is created. The mathematical model may be expressed as a function which receives element data that constitute a user input and outputs a selection prediction. The mathematical model can be generated using a widely known method such as regression analysis, principal component analysis, etc. of each element data included in a cluster.

Once the mathematical model is created, data about a user's pointer movement input may be received in real time and input to the mathematical model in order to determine whether the pointer movement input is a selection-expected input.

If it is determined that the pointer movement input is a selection-expected input, a selection target object may be selected based on a pointer position at that time. For example, an object located around the pointer position at that time may be selected as the selection target object. Then, load target data that should be loaded when the selection target object is selected is preloaded.

When a user input that selects the selection target object is actually made, the preloaded data is accessed to quickly update a GUI shown to the user.

The present invention can also be embodied as computer readable code on a computer readable recording medium. The computer readable recording medium is any data storage device that can store data which can be thereafter read by a computer system. Examples of the computer readable recording medium include ROM, RAM, CD-ROMs, magnetic tapes, floppy disks, optical data storage devices, and carrier waves (e.g., transmission through the Internet). The computer readable recording medium can also be distributed over network coupled computer systems so that the computer readable code is stored and executed in a distributed fashion.

While the present invention has been particularly shown and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation.

INDUSTRIAL APPLICABILITY

According to the present invention, a user device which provides an immediate user interface (UI) response to a user's manipulation can be provided.

The invention claimed is:

1. A data preloading method of a user device, the method comprising:
   predicting whether a selection target object included in a graphic user interface (GUI) will be selected by analyzing a user input to the user device;
   preloading load target data, which should be loaded when the selection target object is selected, if it is predicted that the selection target object will be selected; and
   accessing the preloaded data if the selection target object is selected,
   wherein the preloading of the load target data comprises preloading a part of the load target data, wherein a size of the part to be preloaded is determined according to a type of the load target data.

2. The data preloading method of claim 1, wherein the predicting of whether the selection target object included in the GUI will be selected comprises predicting that the selection target object will be selected if a pointer stays in a preload region of the selection target object for more than a predetermined period of time.

3. The data preloading method of claim 2, further comprising:
   determining a preloading region of the selection target object in proportion to the proportion of the selection target object in a total area of the GUI; and
   adjusting the area of the determined preloading region according to a size of the load target data.

4. The data preloading method of claim 1, wherein the predicting of whether the selection target object included in the GUI will be selected comprises, if a moving speed of the pointer satisfies a predetermined requirement, predicting that a selection target object selected based on a position of the pointer at a time when the moving speed of the pointer satisfies the predetermined requirement will be selected.

5. The data preloading method of claim 1, wherein the predicting of whether the selection target object included in the GUI will be selected comprises predicting whether the selection target object will be selected by inputting data about the user input to the user device into a mathematical model indicating a selection prediction pattern.

6. The data preloading method of claim 1, wherein the predicting of whether the selection target object included in the GUI will be selected comprises predicting that the selection target object will be selected if at least part of a region in which the selection target object is disposed is included in a preload region formed based on the position of the pointer for more than a predetermined period of time.

7. The data preloading method of claim 6, wherein the preload region has a higher weight as it is closer to the position of the pointer, and the preloading of the load target data comprises, if there are a plurality of objects whose disposition regions are at least partially included in the preload region, selecting one selection target object based on a weight corresponding to an overlapping region between the preload region and each of the disposition regions in which the objects are disposed.

8. The data preloading method of claim 1, wherein the predicting of whether the selection target object included in the GUI will be selected comprises:
   measuring and analyzing a gap between a point tip of a pointing device and a touch display of the user device; and
   predicting whether a selection target object corresponding to a position pointed at by the pointing device among objects displayed on the touch display will be selected using the result of analysis.

9. The data preloading method of claim 8, wherein the predicting of whether the selection target object corresponding to the position pointed at by the pointing device among the objects displayed on the touch display will be selected comprises predicting that the selection target object will be selected if the gap between the pointing device and the touch display is less than a predetermined limit.

10. A data preloading method of a user device, the method comprising:
   receiving a selection pre-notification signal according to manipulation of a pointing device and adding a selection target object corresponding to the selection pre-notification signal to a preload pool;
   preloading load target data that should be loaded when the selection target object is selected for each selection target object added to the preload pool; and
   accessing the preloaded data if one of the selection target objects included in the preload pool is selected,
   wherein the preloading of the load target data comprises preloading a part of the load target data, wherein a size of the part to be preloaded is determined according to a type of the load target data.

11. A user device comprising:
   a pupil recognition unit which calculates gaze coordinates indicating a user's pupil position;
   a preloading unit which preloads target object data about the selection target object, which should be loaded when the selection target object is selected, if a pointer stays in a preload region of the selection target object for more than a predetermined period of time and if a gaze position determined by the gaze coordinates and the preload region are included in the same gaze region; and
   a data access unit which accesses the preloaded target object data if the selection target object is selected by the user's manipulation.

12. The user device of claim 11, wherein if the gaze position and the preload region are included in different gaze regions, the preloading unit preloads the target object data according to a moving direction and a moving distance of the gaze position based on a gaze region in which the preload region is included.

13. The user device of claim 11, further comprising:
   a gaze recording unit which records a movement history of the gaze coordinates;
   a gaze movement pattern determination unit which determines a gaze movement pattern using data recorded by the gaze recording unit; and
   a region personalization unit which places gaze regions according to the determined gaze movement pattern.

* * * * *